US012624833B2

(12) United States Patent
Klaus et al.

(10) Patent No.: US 12,624,833 B2
(45) Date of Patent: May 12, 2026

(54) REGENERATIVE THERMAL OXIDIZER, SYSTEM COMPRISING A REGENERATIVE THERMAL OXIDIZER AND METHOD OF OPERATING A REGENERATIVE THERMAL OXIDIZER

(71) Applicant: John Zink KEU GmbH, Krefeld (DE)

(72) Inventors: Wolfgang Klaus, Tönisvorst (DE); Michael Lorra, Rheurdt (DE); Gernot Schwarting, Krefeld (DE)

(73) Assignee: KOCH ENGINEERED SOLUTIONS GMBH, Hilden (DE)

( * ) Notice: Subject to any disclaimer, the term of this patent is extended or adjusted under 35 U.S.C. 154(b) by 524 days.

(21) Appl. No.: 18/177,169

(22) Filed: Mar. 2, 2023

(65) Prior Publication Data

US 2023/0304660 A1      Sep. 28, 2023

(30) Foreign Application Priority Data

Mar. 24, 2022     (EP) .................................... 22164241

(51) Int. Cl.
*F23G 7/06*          (2006.01)
*B01D 53/00*        (2006.01)
(Continued)

(52) U.S. Cl.
CPC ........... *F23G 7/068* (2013.01); *B01D 53/005* (2013.01); *B01D 53/343* (2013.01); *B01D 53/44* (2013.01);
(Continued)

(58) Field of Classification Search
CPC ........ F23G 7/068; F23G 5/46; F23G 2207/30; F23G 2209/14; B01D 53/44; B01D 53/343; B01D 53/005
See application file for complete search history.

(56) References Cited

U.S. PATENT DOCUMENTS 5,259,757 A * 11/1993 Plejdrup ................. F23G 7/068
                                                                110/211
5,297,954 A * 3/1994 Colagiovanni ......... F23G 7/068
                                                                110/211
(Continued)

FOREIGN PATENT DOCUMENTS

CN        107781829 A      3/2018
CN        111750367 A      10/2020
(Continued)

OTHER PUBLICATIONS

International Search Report and Written Opinion received for PCT Application No. PCT/IB2023/050968, mailed on Apr. 14, 2023, 10 pages.

(Continued)

*Primary Examiner* — Ko-Wei Lin

(57)          ABSTRACT

The present disclosure relates to a regenerative thermal oxidizer comprising at least a first transfer chamber and at least a second transfer chamber, wherein the first transfer chamber comprises a first bed and the second transfer chamber comprises a second bed; at least one reaction chamber in fluid flow communication with the first transfer chamber and with the second transfer chamber, wherein waste gas is introducible into the regenerative thermal oxidizer to flow through the first bed to the reaction chamber or to flow through the second bed to the reaction chamber; and one or more first oxygen-containing gas inlet for introducing oxygen-containing gas into the regenerative thermal oxidizer positioned between at least a portion of the first bed and at least a portion of the reaction chamber or positioned between at least a portion of the second bed and at least a portion of the reaction chamber.

20 Claims, 9 Drawing Sheets

(51) Int. Cl.
   B01D 53/34      (2006.01)
   B01D 53/44      (2006.01)
   F23G 5/46       (2006.01)
(52) U.S. Cl.
   CPC .......... *F23G 5/46* (2013.01); *B01D 2257/708*
   (2013.01); *F23G 2207/30* (2013.01)

(56)                References Cited

U.S. PATENT DOCUMENTS

| | | | | |
|---|---|---|---|---|
| 5,941,697 A * | 8/1999 | Chaouki | ................. | F23C 13/00 |
| | | | | 431/11 |
| 6,183,707 B1 * | 2/2001 | Gosselin | ................ | B01D 53/34 |
| | | | | 423/245.3 |
| 6,321,462 B1 * | 11/2001 | Seidl | ......................... | F23G 7/07 |
| | | | | 34/423 |
| 10,487,283 B1 * | 11/2019 | Jamaluddin | ................ | F23J 7/00 |
| 2005/0249644 A1 * | 11/2005 | Schedler | ................. | F23G 7/068 |
| | | | | 422/178 |
| 2016/0339382 A1 | 11/2016 | Mulleder et al. | | |
| 2021/0262659 A1 * | 8/2021 | Augustsson | ........... | B01D 53/72 |

FOREIGN PATENT DOCUMENTS

| | | |
|---|---|---|
| JP | 2009299947 A | 12/2009 |
| WO | 2011036940 A1 | 3/2011 |

OTHER PUBLICATIONS

International Search Report and Written Opinion received for PCT Application No. PCT/IB2023/050971, mailed on Apr. 19, 2023, 12 pages.

\* cited by examiner

1000

REGENERATIVE THERMAL OXIDIZER, SYSTEM COMPRISING A REGENERATIVE THERMAL OXIDIZER AND METHOD OF OPERATING A REGENERATIVE THERMAL OXIDIZER

CROSS-REFERENCE TO RELATED APPLICATIONS

This application claims priority to European Patent Application Number 22164241.6, filed Mar. 24, 2022, which is incorporated herein by reference in its entirety.

FIELD OF THE DISCLOSURE

The present disclosure relates to a regenerative thermal oxidizer, a system comprising a regenerative thermal oxidizer and a method of operating a regenerative thermal oxidizer.

BACKGROUND OF THE DISCLOSURE

Several types of regenerative thermal oxidizers (RTOs) are known in the art. RTOs are typically used for oxidation (combustion) of volatile organic compounds (VOCs) in waste gas streams. RTOs often include two separated beds that are in fluid communication with a common reaction room. Waste gas is introduced into the RTO to flow through one of the beds to preheat the waste gas. In the reaction room, VOCs are oxidized and the produced flue gas flows through the other one of the beds and transfers thermal energy to the bed. After a certain time period, the gas flow is switched such that waste is introduced into the RTO to flow through the bed that was previously heated by the flue gas and flue gas produced in the reaction room is directed through the bed that was previously used to preheat the waste gas. Due to the design of RTOs, a substantial amount of (thermal) energy can be recovered.

For a typical RTO, the waste gas stream to be oxidized will be mixed and diluted with air prior to entering the RTO. The waste gas often contains burnable compounds, such as VOCs, hydrogen, hydrogen sulfide and carbon monoxide. In some countries, a minimum dilution of the waste gas is to maintain less than 25% of the lower explosion limit of the mixture (waste gas and air). For example, this is required by BS-EN 12753. Especially when the waste gas contains hydrogen, the required amount of air for the dilution of the waste gas is substantial. In some countries, the dilution is set by regulation, in other countries the decision is made in accordance with good engineering practice.

As a result, known RTOs are physically large, expensive to operate and require measurement equipment for measuring or determining the lower explosion limit.

It is an object of the present disclosure to provide an RTO that is physically small. Another object of the present disclosure is to provide an RTO that is inexpensive to manufacture. Yet another object of the present disclosure is to provide an RTO that is inexpensive to operate. Yet another object of the present disclosure is to provide an RTO which reduces energy consumption. Yet another object of the present disclosure is to provide an RTO that reduces carbon dioxide and/or nitrogen oxide emission.

SUMMARY OF THE DISCLOSURE

One or more of the above objects are solved by the combination of features of the independent claims. Advantageous embodiments are provided in the respective dependent claims. Features of an independent claim may be combined with features of one or more claims dependent on the independent claim, and features of one or more dependent claims can be combined with each other.

According to an aspect of the present disclosure, a regenerative thermal oxidizer is presented. The regenerative thermal oxidizer may comprise at least a first transfer chamber. The regenerative thermal oxidizer may include at least a second transfer chamber. The first transfer chamber may comprise a first bed. The second transfer chamber may comprise a second bed. The regenerative thermal oxidizer may include at least one reaction chamber. The reaction chamber may be in fluid communication with the first transfer chamber. The reaction chamber may be in fluid communication with the second transfer chamber. Waste gas may be introducible into the regenerative thermal oxidizer to flow through the first bed to the reaction chamber. Alternatively or additionally, waste gas may be introducible into the regenerative thermal oxidizer to flow through the second bed to the reaction chamber. The regenerative thermal oxidizer may comprise one or more first oxygen-containing gas inlet for introducing oxygen-containing gas into the regenerative thermal oxidizer. The one or more first oxygen-containing gas inlet may be positioned or disposed between at least a portion of the first bed and at least a portion of the reaction chamber. Alternatively or additionally, the one or more first oxygen-containing gas inlet may be positioned or disposed between at least a portion of the second bed and at least a portion of the reaction chamber.

According to an aspect of the present disclosure, a system is presented. The system may comprise a regenerative thermal oxidizer. The regenerative thermal oxidizer may be any herein disclosed regenerative thermal oxidizer. For example, the regenerative thermal oxidizer comprises at least a first transfer chamber. The regenerative thermal oxidizer may comprise at least a second transfer chamber. The first transfer chamber may comprise a first bed. The second transfer chamber may comprise a second bed. The regenerative thermal oxidizer may comprise at least one reaction chamber. The reaction chamber may be in fluid communication with the first transfer chamber. The reaction chamber may be in fluid communication with the second transfer chamber. The system may comprise a waste gas tube for connecting a waste gas source with at least the first transfer chamber and/or at least the second transfer chamber. The system may comprise an oxygen-containing gas tube for connecting an oxygen-containing gas source with the regenerative thermal oxidizer. The system may comprise a controller. The controller may be configured to direct waste gas via the waste gas tube through the first bed to the reaction chamber, such that the waste gas is preheated by the first bed. The waste gas may include at least one oxidizable compound. The controller may be configured to direct oxygen-containing gas via the oxygen-containing gas tube to the regenerative thermal oxidizer, such that the oxygen-containing gas enters the regenerative thermal oxidizer downstream of at least a portion of the first bed.

The system may include any herein disclosed regenerative thermal oxidizer.

According to an aspect of the present disclosure, a method of operating a regenerative thermal oxidizer is presented. The method may comprise: Directing waste gas through a first bed of a first transfer chamber of the regenerative thermal oxidizer to a reaction chamber of the regenerative thermal oxidizer, such that the waste gas is preheated by the first bed. The waste gas may include at least one oxidizable compound. The method may comprise: Directing oxygen-containing gas to the regenerative thermal oxidizer, such that the oxygen-containing gas enters the regenerative thermal oxidizer downstream of at least a portion of the first bed.

Any herein disclosed regenerative thermal oxidizer may be operated by the method. Any herein disclosed system may be operated by the method.

According to the present disclosure, waste gas including a compound to be oxidized, for example a pollutant, may be directed towards the reaction chamber of the regenerative thermal oxidizer without dilution of the waste gas with air prior to entering the regenerative thermal oxidizer. Oxygen required for the oxidation of the compound to be oxidized may be separately introduced into the regenerative thermal oxidizer. By separately introducing waste gas and oxygen into the regenerative thermal oxidizer, a significantly smaller gas volume flows through the beds of the regenerative thermal oxidizer and, hence, an efficiency of preheating of the waste gas is increased.

A regenerative thermal oxidizer may comprise a bed which is preheated from a previous oxidation cycle to preheat the input gases, e.g., waste gas. Thereby, (thermal) energy can be regenerated. Compounds of the input gases may be oxidized at an elevated temperature, for example at least 500° C.

The regenerative thermal oxidizer may include a first transfer chamber and a second transfer chamber. Each of the transfer chambers may be a half-chamber, i.e., at least one side of the chamber may be open. The first and second transfer chambers may be (partially) separated by a wall. The wall may extend in the regenerative thermal oxidizer, preferably towards the reaction chamber.

The first transfer chamber may comprise a first bed. The second transfer chamber may comprise a second bed. Each of the herein disclosed beds may comprise a packing. For example, the packing may be a structured packing or a random packing. Each of the herein disclosed beds may comprise a ceramic material. The waste gas may flow through the bed to exchange (thermal) energy with the bed. For example, when the temperature of the waste gas is lower than the temperature of a bed, the waste gas is heated or preheated when it flows through the bed.

The first transfer chamber may be in fluid communication with the reaction chamber of the regenerative thermal oxidizer. The second transfer chamber may be in fluid communication with the reaction chamber of the regenerative thermal oxidizer. The reaction chamber may be a reaction room. For example, the transfer chambers may be (physically) separated from each other. One side of each of the transfer chambers may be open towards the reaction chamber. Preferably, the first transfer chamber, the second transfer chamber and the reaction chamber may be designed such that a fluid (e.g., a gas) may flow from the first transfer chamber to the reaction chamber. From the reaction chamber, the fluid may flow to the second transfer chamber. Preferably, inside the regenerative thermal oxidizer a fluid is not able to flow from the first transfer chamber to the second transfer chamber without passing through the reaction chamber.

A transfer chamber may be designed such that a fluid (e.g., a gas or a liquid) is guided from outside of the regenerative thermal oxidizer through the bed of the transfer chamber to the reaction chamber and/or a transfer chamber may be designed such that a fluid (e.g., a gas or a liquid) is guided from the reaction chamber through the bed of the transfer chamber to outside of the regenerative thermal oxidizer.

The oxidizable compound of the waste gas may be oxidized in the reaction chamber. The oxidation of the oxidizable compound may occur by a chemical reaction of the oxidizable compound and oxygen of the oxygen-containing gas.

A temperature in the reaction chamber may be at least 500° C., preferably at least 600° C., more preferably at least 700° C., more preferably at least 800° C. Alternatively or additionally, the temperature in the reaction chamber may be at most 1500° C., preferably at most 1300° C., more preferably at most 1100° C. Specifically, the temperature in the reaction chamber may be between 800° C. and 1300° C.

As mentioned above, the waste gas may comprise one or more oxidizable compound. Preferably, the waste gas comprises at least two different oxidizable compounds, more preferably at least three different oxidizable compounds, more preferably at least five different oxidizable compounds, more preferably at least ten different oxidizable compounds, more preferably at least twenty different oxidizable compounds. Different oxidizable compounds may be different by at least one chemical or physical characteristic. For example, different oxidizable compounds may have a different chemical composition and/or different oxidizable compounds may have a different boiling point.

Specific examples of an oxidizable compound include at least one hydrocarbon, at least one volatile organic compound (VOCs), hydrogen sulfide ($H_2S$), hydrogen ($H_2$) and/or carbon monoxide (CO). Preferably, the waste gas includes at least one sulfur-containing compound or elementary sulfur. The sulfur-containing compound or elementary sulfur may be the oxidizable compound in the waste gas.

The waste gas may be gas which was treated or pretreated in a previous gas treatment unit. For example, the waste gas may be tail gas of a sulfur recovery unit. The sulfur recovery unit may employ or comprise a Claus process. In general, the waste gas may be any gas that comprises an oxidizable compound, preferably the oxidizable compound is a pollutant. The waste gas may include vent gas and/or sweep gas from a sulfur pit. Also, vent gas and/or sweep gas from a sulfur pit may be introduced into the regenerative thermal oxidizer separately from the waste gas.

The waste gas source may be gas treatment unit, for example a sulfur recovery unit. The waste gas source may be an outlet or exit of the gas treatment unit.

Preferably, the oxygen-containing gas includes at least 5 vol.-% oxygen ($O_2$), more preferably at least 10 vol.-% oxygen, more preferably at least 15 vol.-% oxygen, more preferably at least 20 vol.-% oxygen, more preferably at least 25 vol.-% oxygen, more preferably at least 30 vol.-% oxygen, more preferably at least 35 vol.-% oxygen, more preferably at least 40 vol.-% oxygen, more preferably at least 50 vol.-% oxygen, more preferably at least 60 vol.-% oxygen, more preferably at least 70 vol.-% oxygen, more preferably at least 80 vol.-% oxygen, more preferably at least 90 vol.-% oxygen. For example, the oxygen-containing gas may be air. The air may be air surrounding the regenerative thermal oxidizer and/or the system. The oxygen-containing gas source may be the surrounding or the environment of the regenerative thermal oxidizer and/or the system.

The regenerative thermal oxidizer may comprise one or more first oxygen-containing gas inlet for introducing oxygen-containing gas into the regenerative thermal oxidizer. The one or more first oxygen-containing gas inlet may be positioned between at least a portion of the first bed and at least a portion of the reaction chamber. For example, the one or more first oxygen-containing gas inlet may be a bore or a nozzle in a wall of the first transfer chamber. Alternatively, the one or more first oxygen-containing gas inlet may be a bore or a nozzle in a wall of the reaction chamber.

The first oxygen-containing gas inlet may be positioned or disposed such that the oxygen-containing gas enters into the first transfer chamber and/or into the reaction chamber.

When waste gas flows through the first bed of the first transfer chamber to the reaction chamber, the one or more first oxygen-containing gas inlet may be positioned or disposed downstream (in the direction in which the fluid flows) of at least a portion of the first bed. In other words, the one or more first oxygen-containing gas inlet may be positioned such that oxygen-containing gas enters the regenerative thermal oxidizer downstream or after at least a portion of the first bed.

When waste gas flows from the reaction chamber through the first bed of the first transfer chamber, one or all first oxygen-containing gas inlets may be closed. When one or all first oxygen-containing gas inlets is/are closed, no oxygen-containing gas may enter the regenerative thermal oxidizer via one or all first oxygen-containing gas inlet.

A distance between the one or more first oxygen-containing gas inlet and at least a portion of the first bed may be less than 2.00 m, preferably less than 1.50 m, more preferably less than 1.00 m, more preferably less than 0.80 m, more preferably less than 0.60 m, more preferably less than 0.40 m, more preferably less than 0.20 m. Alternatively or additionally, a distance between the one or more first oxygen-containing gas inlet and at least a portion of the first bed may be at least 0.05 m, preferably at least 0.10 m, more preferably at least 0.15 m.

Alternatively, the one or more first oxygen-containing gas inlet may be positioned between at least a portion of the second bed and at least a portion of the reaction chamber. For example, the one or more first oxygen-containing gas inlet may be a bore or a nozzle in a wall of the second transfer chamber. Alternatively, the one or more first oxygen-containing gas inlet may be a bore or a nozzle in a wall of the reaction chamber. The one or more first oxygen-containing gas inlet between at least a portion of the second bed and the portion of the reaction chamber may be designed and/or positioned and/or disposed similar or equally than the one or more first oxygen-containing gas inlet between at least a portion of the first bed and the portion of the reaction chamber.

For example, a distance between the one or more first oxygen-containing gas inlet and at least a portion of the second bed may be less than 2.00 m, preferably less than 1.50 m, more preferably less than 1.00 m, more preferably less than 0.80 m, more preferably less than 0.60 m, more preferably less than 0.40 m, more preferably less than 0.20 m. Alternatively or additionally, a distance between the one or more first oxygen-containing gas inlet and at least a portion of the second bed may be at least 0.05 m, preferably at least 0.10 m, more preferably at least 0.15 m.

It is preferred that the one or more first oxygen-containing gas inlet is positioned closer to the reaction chamber than to an inlet of the waste gas into the regenerative thermal oxidizer. More preferably, the one or more first oxygen-containing gas inlet is positioned closer to the reaction chamber than to an inlet of the waste gas into the first transfer chamber or into the second transfer chamber.

In general, the portion of the reaction chamber may be any portion of the reaction chamber. Preferably, a distance between the portion of the reaction chamber and at least a portion of a bed, for example the first bed and/or the second bed, may be at least 0.20 m, preferably at least 0.40 m, more preferably at least 0.60 m, more preferably at least 0.80 m, more preferably at least 1.00 m, more preferably at least 1.20 m, more preferably at least 1.50 m, more preferably at least 2.00 m. Alternatively or additionally, a distance between the portion of the reaction chamber and at least a portion of a bed, for example the first bed and/or the second bed, may be at most 2.50 m, preferably at most 2.00 m, more preferably at most 1.50 m, more preferably at most 1.20 m, more preferably at most 1.00 m, more preferably at most 0.80 m, more preferably at most 0.60 m, more preferably at most 0.40 m. A distance between the portion of the reaction chamber and at least a portion of a bed, for example the first bed and/or the second bed, may be about 2.00 m, about 1.50 m, about 1.00 m or about 0.50 m.

In general, a distance may be a shortest distance between two objects or elements or points (e.g. the length of the space between two objects or elements or points).

In general, oxygen-containing gas may be introduced into the regenerative thermal oxidizer such that the oxygen-containing gas is introduced into a bed, for example the first bed or the second bed. Alternatively or additionally, the oxygen-containing gas may be introduced into the regenerative thermal oxidizer such that the oxygen-containing gas is introduced outside a bed, for example the first bed or the second bed.

In general, the portion of a bed, for example the portion of the first bed or a portion of the second bed, may be any portion of the bed. The portion of the bed may be an upper portion or a lower portion of the bed. The portion of the bed may be located between an upper portion and a lower portion of the bed. For example, the portion of the bed may be a portion that is an outermost portion of the bed in downstream direction. For example, the portion of the bed may be a portion that is an outermost, upper or lower half portion of the bed in downstream direction. Also, the portion of the bed may be a portion that is an outermost portion of the bed in upstream direction. Also, the portion of the bed may be a portion that is an outermost, upper or lower half portion of the bed in upstream direction.

When waste gas flows through a bed, for example the first bed and/or the second bed, to the reaction chamber, the waste gas may be preheated. At the same time, the bed may be cooled. When gas, for example flue gas produced by oxidizing the oxidizable compound of the waste gas in the reaction chamber, flows from the reaction chamber through a bed, for example the first bed and/or the second bed, the gas may be cooled. At the same time, the bed may be heated.

Oxygen of the oxygen-containing gas may be used to oxidize the oxidizable compound of the waste gas. Preferably, oxygen of the oxygen-containing gas may not be used to fire a burner.

The oxygen-containing gas may be introduced into the regenerative thermal oxidizer to provide oxygen in the reaction chamber. In the reaction chamber, the oxygen may oxidize the oxidizable compound of the waste gas.

The regenerative thermal oxidizer may comprise the one or more first oxygen-containing gas inlet for introducing oxygen-containing gas into the regenerative thermal oxidizer positioned between at least a portion of the first bed and at least a portion of the reaction chamber. Further, the thermal oxidizer may comprise one or more second oxygen-containing gas inlet for introducing oxygen-containing gas into the regenerative thermal oxidizer positioned between at least a portion of the second bed and at least a portion of the reaction chamber. The portion of the reaction chamber may be one portion or the same portion of the reaction chamber.

The one or more first oxygen-containing gas inlet may correspond to the first transfer chamber, preferably correspond to the first bed. The one or more second oxygen-containing gas inlet may correspond to the second transfer chamber, preferably correspond to the second bed.

When the one or more first oxygen-containing gas inlet is open to introduce oxygen-containing gas into the regenerative thermal oxidizer, the one or more second oxygen-containing gas inlet may be closed such that no oxygen-containing gas is introduced into the regenerative thermal oxidizer. When the one or more second oxygen-containing gas inlet is open to introduce oxygen-containing gas into the regenerative thermal oxidizer, the one or more first oxygen-containing gas inlet may be closed such that no oxygen-containing gas is introduced into the regenerative thermal oxidizer.

Preferably, only the one or more first oxygen-containing gas inlet is open at a point in time. Only the one or more second oxygen-containing gas inlet may be open at a point in time.

The regenerative thermal oxidizer may comprise a heater. The one or more first oxygen-containing gas inlet may be positioned or disposed closer to the first bed than to the heater. Preferably, a distance between the one or more first oxygen-containing gas inlet and at least a portion of the first bed may be smaller than a distance between the one or more first oxygen-containing gas inlet and the heater. The distance between the one or more first oxygen-containing gas inlet and at least a portion of the first bed may be smaller by at least 0.10 m, preferably by at least 0.20 m, more preferably by at least 0.30 m, more preferably by at least 0.50 m, than a distance between the one or more first oxygen-containing gas inlet and the heater.

A distance between the one or more first oxygen-containing gas inlet and the heater may be at least 0.10 m, preferably at least 0.20 m, more preferably at least 0.30 m, more preferably at least 0.40 m, more preferably at least 0.50 m, more preferably at least 0.75 m, more preferably at least 1.00 m, more preferably at least 1.50 m, more preferably at least 2.00 m.

The one or more second oxygen-containing gas inlet may be positioned similarly or equally relative to the heater and/or relative to the second bed as the one or more first oxygen-containing gas inlet.

The regenerative thermal oxidizer may comprise at least a third transfer chamber. The third transfer chamber may comprise a third bed. The reaction chamber may be in fluid flow communication with the third transfer chamber. The regenerative thermal oxidizer may comprise one or more third oxygen-containing gas inlet for introducing oxygen-containing gas into the regenerative thermal oxidizer. The one or more third oxygen-containing gas inlet may be positioned between at least a portion of the third bed and at least a portion of the reaction chamber.

The third transfer chamber may be similarly or equally designed and/or positioned as the first and/or second transfer chamber. The one or more third oxygen-containing gas inlet may be similarly or equally designed and/or positioned as the one or more first and/or the one or more second oxygen-containing gas inlet. The third bed may be similarly or equally designed and/or positioned as the first and/or second bed.

For example, the third transfer chamber may be a half-chamber. The first, second and third transfer chambers may be (partially) separated by a wall, at least two walls or at least three walls.

The one or more third oxygen-containing gas inlet may be positioned between at least a portion of the third bed and at least a portion of the reaction chamber. The one or more third oxygen-containing gas inlet may be a bore or a nozzle in a wall of the third transfer chamber.

A distance between the one or more third oxygen-containing gas inlet and at least a portion of the third bed may be less than 2.00 m, preferably less than 1.50 m, more preferably less than 1.00 m, more preferably less than 0.80 m, more preferably less than 0.60 m, more preferably less than 0.40 m, more preferably less than 0.20 m. Alternatively or additionally, a distance between the one or more third oxygen-containing gas inlet and at least a portion of the third bed may be at least 0.05 m, preferably at least 0.10 m, more preferably at least 0.15 m.

The one or more third oxygen-containing gas inlet may be positioned closer to the reaction chamber than to an inlet of the waste gas into the regenerative thermal oxidizer.

A distance between the one or more third oxygen-containing gas inlet and at least a portion of the third bed may be smaller than a distance between the third oxygen-containing gas inlet and the heater. A distance between the one or more third oxygen-containing gas inlet and at least a portion of the third bed may be smaller by at least 0.10 m, preferably by at least 0.20 m, more preferably by at least 0.30 m, more preferably by at least 0.50 m, than a distance between the one or more third oxygen-containing gas inlet and the heater.

A distance between the one or more third oxygen-containing gas inlet and the heater may be at least 0.10 m, preferably at least 0.20 m, more preferably at least 0.30 m, more preferably at least 0.40 m, more preferably at least 0.50 m, more preferably at least 0.75 m, more preferably at least 1.00 m, more preferably at least 1.50 m, more preferably at least 2.00 m.

The one or more third oxygen-containing gas inlet may correspond to the third transfer chamber. When the one or more third oxygen-containing gas inlet is open to introduce oxygen-containing gas into the regenerative thermal oxidizer, the one or more first second oxygen-containing gas inlets and the one or more second oxygen-containing gas inlet may be closed.

The regenerative thermal oxidizer may comprise at least two oxygen-containing gas inlets per transfer chamber. Preferably, the regenerative thermal chamber comprises at least three oxygen-containing gas inlets per transfer chamber. More preferably, the regenerative thermal chamber comprises at least four oxygen-containing gas inlets per transfer chamber.

For example, the one or more first oxygen-containing gas inlet may comprise at least two first oxygen-containing gas inlets. The one or more first oxygen-containing gas inlet may introduce oxygen-containing gas into the regenerative thermal oxidizer. Each of the first oxygen-containing gas inlets may correspond to the first transfer chamber. The first oxygen-containing gas inlet may comprise at least three first oxygen-containing gas inlets or at least four first oxygen-containing gas inlets.

Similarly, the one or more second oxygen-containing gas inlet may comprise at least two second oxygen-containing gas inlets, at least three second oxygen-containing gas inlets or at least four second oxygen-containing gas inlets. Similarly, the one or more third oxygen-containing gas inlet may comprise at least two third oxygen-containing gas inlets, at least three third oxygen-containing gas inlets or at least four third oxygen-containing gas inlets.

Each of the transfer chambers may have a circular or polygonal (e.g., rectangular or square) cross section. The one or more first oxygen-containing gas inlet, second oxygen-containing gas inlet and/or third oxygen-containing gas inlet may be evenly or non-evenly distributed along a circumference of the respective transfer chamber. For example, when the one or more first oxygen-containing gas inlet comprises two, three or four first oxygen-containing gas inlets, the two, three or four first oxygen-containing gas inlets may be evenly or non-evenly distributed along the circumference of the first transfer chamber. Oxygen-containing gas inlets of the one or more second oxygen-containing gas inlet and/or the one or more third oxygen-containing gas inlet may be similarly or equally positioned at the respective transfer chamber.

Each of the transfer chambers may comprise more than one transfer chamber. For example, the first, second and/or third transfer chamber may comprise at least two, at least three, at least four, at least five or at least ten transfer chambers.

As mentioned above, a system may comprise a regenerative thermal oxidizer. The waste gas tube may connect a waste gas source with at least the first transfer chamber and the second transfer chamber.

The waste gas tube may be any suitable tube for connecting the waste gas source with the first transfer chamber and the second transfer chamber such that the waste gas source and the first transfer chamber as well as the second transfer chamber are in fluid flow communication. Additionally, the waste gas tube may connect the waste gas source with the third transfer chamber such that the waste gas source and the third transfer chamber are in fluid flow communication. The waste gas tube may comprise one or more valves. Different sections of the waste gas tube may be open or closed, depending on the valve position of the one or more valves.

For example, the waste gas tube may only connect one of the transfer chambers such that the waste gas source is in fluid flow communication with the one transfer chamber at a point in time. At the same point in time, other transfer chambers may not be in fluid flow communication with the waste gas source.

The oxygen-containing gas tube may be any suitable tube for connecting the oxygen-containing gas source with the first transfer chamber and the second transfer chamber such that the oxygen-containing gas source and the first transfer chamber as well as the second transfer chamber are in fluid flow communication. Additionally, the oxygen-containing gas tube may connect the oxygen-containing gas source with the third transfer chamber such that the oxygen-containing gas source and the third transfer chamber are in fluid flow communication. The oxygen-containing gas tube may comprise one or more valves. Different sections of the oxygen-containing gas tube may be open or closed, depending on the valve position of the one or more valves.

For example, the oxygen-containing gas tube may only connect one of the transfer chambers such that the oxygen-containing gas source is in fluid flow communication with the one transfer chamber at a point in time. At the same point in time, other transfer chambers may not be in fluid flow communication with the oxygen-containing source.

When waste gas flows through a bed (e.g. the first bed or the second bed or the third bed) of a transfer chamber (e.g. the first transfer chamber or the second transfer chamber or the third transfer chamber) towards the reaction chamber, the waste gas may be introduced into the regenerative thermal oxidizer upstream of at least a portion of the bed and the oxygen-containing gas may be introduced into the regenerative thermal oxidizer downstream of at least a portion of the bed.

The system may comprise a controller. The controller may be a hardware component configured to control the overall operations of the regenerative thermal oxidizer and/or the system. The controller may include at least one processor. A processor may be implemented as an array of a plurality of logic gates or can be implemented as combination of a microprocessor and a memory. A program executable by the microprocessor may be stored in the memory. The skilled person readily understands that the controller may be implemented in various hardware forms. Functions of the regenerative thermal oxidizer and/or of the system may be controlled by the controller.

The controller may be configured to direct waste gas via the waste gas tube through the first bed to the reaction chamber. The waste gas may be preheated by the first bed. At the same time the bed may be cooled. Preferably, the controller is configured to control valve positions of valves of the waste gas tubes to direct the waste gas to the reaction chamber.

The controller may be configured to direct only waste gas, preferably from the waste gas source, through the first bed to the reaction chamber. In other words, the controller may be configured to direct no other gas than the waste gas through the first bed towards the reaction chamber, i.e., only waste gas flows through the first bed. Preferably, oxygen-containing gas is not directed through the first bed towards the reaction chamber by the controller.

The pressure in the waste gas source may be higher than the pressure in one or each of the transfer chambers. A pressure unit, for example a blower, may be arranged along the waste gas tube for increasing the pressure of the waste gas. Similarly, a pressure unit, for example a blower, may be arranged along the oxygen-containing gas tube for increasing the pressure of the oxygen-containing gas.

The controller may be configured to direct oxygen-containing gas via the oxygen-containing gas tube to the regenerative thermal oxidizer, such that the oxygen-containing gas enters the regenerative thermal oxidizer downstream of at least a portion of the first bed.

During a first cycle, the controller may be configured to direct the waste gas via the waste gas tube through the first bed to the reaction chamber, such that the waste gas is preheated by the first bed. During the first cycle, the controller may be configured to direct the oxygen-containing gas via the oxygen-containing gas tube to the regenerative thermal oxidizer, such that the oxygen-containing gas enters the regenerative thermal oxidizer downstream of at least a portion of the first bed. During a second cycle, the controller may be configured to direct the waste gas via the waste gas tube through the second bed to the reaction chamber, such that the waste gas is preheated by the second bed. During the second cycle, the controller may be configured to direct the oxygen-containing gas via the oxygen-containing gas tube to the regenerative thermal oxidizer, such that the oxygen-containing gas enters the regenerative thermal oxidizer downstream of at least a portion of the second bed.

In general, the regenerative thermal oxidizer or the system may perform predefined functions, preferably for a predetermined time period, in a cycle. In different cycles the functions performed by the regenerative thermal oxidizer or the system may be different. Also, different cycles may be performed for different time periods. The regenerative thermal oxidizer or the system may be configured to perform cycles repeatedly. For example, a first cycle may be performed. Then, a second cycle may be performed. Afterwards, a first cycle may be performed again followed by another second cycle, etc.

Preferably, the first cycle and the second cycle may be performed during different time periods. In other words, only one of the cycles may be performed in a point in time or during a time period. The first cycle and the second cycle may be consecutively performed, i.e., the second cycle follows the first cycle, the second cycle is followed by the first cycle, etc. Additional cycles may be performed before, between or after first and second cycles.

The first cycle may be performed for at least 10 s, preferably for at least 30 s, more preferably for at least 45 s, more preferably for at least 60 s, more preferably for at least 90 s, more preferably for at least 120 s. The second cycle may be performed for at least 10 s, preferably for at least 30 s, more preferably for at least 45 s, more preferably for at least 60 s, more preferably for at least 90 s, more preferably for at least 120 s, more preferably for at least 240 s.

During the first cycle, no waste gas may be directed through the second bed to the reaction chamber. Alternatively or additionally, during the second cycle, no waste gas may be directed through the first bed to the reaction chamber.

In general, oxygen-containing gas may be introduced into or directed to the regenerative thermal oxidizer via one or more oxygen-containing gas inlets (e.g. the one or more first oxygen-containing gas inlet and/or the one or more second oxygen-containing gas inlet and/or the one or more third oxygen-containing gas inlet).

During the first cycle, the controller may be configured to direct the oxygen-containing gas via the oxygen-containing gas tube to the regenerative thermal oxidizer, such that the oxidizable compound of the waste gas is oxidized and flue gas is produced in the reaction chamber. During the first cycle, the controller may be configured to direct the flue gas from the reaction chamber through the second bed, such that the flue gas is cooled by the second bed. During the second cycle, the controller may be configured to direct the oxygen-containing gas via the oxygen-containing gas tube to the regenerative thermal oxidizer, such that the oxidizable compound of the waste gas is oxidized and flue gas is produced in the reaction chamber. During the second cycle, the controller may be configured to direct the flue gas from the reaction chamber through the first bed, such that the flue gas is cooled by the first bed.

Flue gas may be produced in the reaction chamber by reaction of the at least one oxidizable compound of the waste gas and oxygen of the oxygen-containing gas. The gas composition resulting from the reaction may be called flue gas. The reaction may be endothermic or exothermic.

When the flue gas is directed from the reaction chamber through a bed and the flue gas is cooled by the bed, the bed is heated. The (thermal) energy stored in the bed can be used to preheat waste gas in a subsequent cycle.

The first and second cycles may be performed alternately. No other or additional cycles may be performed between consecutive first and second cycles.

The regenerative thermal oxidizer may comprise at least a third transfer chamber. The third transfer chamber may comprise a third bed. The reaction chamber may be in fluid flow communication with the third transfer chamber. During a third cycle, the controller may be configured to direct the waste gas via the waste gas tube through the third bed to the reaction chamber, such that the waste gas is preheated by the third bed. During the third cycle, the controller may be configured to direct oxygen-containing gas via the oxygen-containing gas tube to the regenerative thermal oxidizer, such that the oxygen-containing gas enters the regenerative thermal oxidizer downstream of at least a portion of the third bed.

The regenerative thermal oxidizer may comprise at least three transfer chambers. The regenerative thermal oxidizer may be operated in at least three cycles or at least six cycles.

The system may comprise a bypass tube for connecting a heat exchanger with the regenerative thermal oxidizer, preferably for connecting the heat exchanger with the reaction chamber of the regenerative thermal oxidizer. The controller may be configured to direct gas from the regenerative thermal oxidizer to the heat exchanger such that the gas is cooled by the heat exchanger.

Preferably, flue gas from the reaction chamber of the regenerative thermal oxidizer may be directed to the heat exchanger. The flue gas may be cooled by the heat exchanger.

The heat exchanger may be configured to allow an exchange of (thermal) energy or heat between gas from the regenerative thermal oxidizer and the waste gas prior to entry of the waste gas into the regenerative thermal oxidizer. Also, the heat exchanger may be configured to allow an exchange of (thermal) energy or heat between gas from the regenerative thermal oxidizer and the oxygen-containing gas prior to entry of the oxygen-containing gas into the regenerative thermal oxidizer. Also, the heat exchanger may be configured to allow an exchange of (thermal) energy or heat between gas from the regenerative thermal oxidizer and a heat recovery system. Also, the heat exchanger may be configured to allow an exchange of (thermal) energy or heat between gas from the regenerative thermal oxidizer and a superheater, preferably a steam superheater.

The waste gas, the oxygen-containing gas, the heat recovery system and/or the superheater may be heated by the heat exchanger. At the same time, the gas from the regenerative thermal oxidizer may be cooled by the heat exchanger.

Gas from the regenerative thermal oxidizer, preferably from the reaction chamber of the regenerative thermal oxidizer, may be directed to the heat exchanger during any one of the cycles. Preferably, gas from the regenerative thermal oxidizer, preferably from the reaction chamber of the regenerative thermal oxidizer, is directed to the heat exchanger during the first, second and third cycles.

In general, the waste gas may comprise less than 20.0 vol.-% oxygen ($O_2$). Preferably, the waste gas comprises less than 17.5 vol.-% oxygen, more preferably less than 15.0 vol.-% oxygen, more preferably less than 12.5 vol.-% oxygen, more preferably less than 10.0 vol.-% oxygen, more preferably less than 9.0 vol.-% oxygen, more preferably less than 8.0 vol.-% oxygen, more preferably less than 7.0 vol.-% oxygen, more preferably less than 6.0 vol.-% oxygen, more preferably less than 5.0 vol.-% oxygen, more preferably less than 4.0 vol.-% oxygen, more preferably less than 3.0 vol.-% oxygen, more preferably less than 2.0 vol.-% oxygen, more preferably less than 1.0 vol.-% oxygen, more preferably less than 0.5 vol.-% oxygen, more preferably less than 0.1 vol.-% oxygen, in particular when entering the regenerative thermal oxidizer. The waste gas may be free of oxygen, i.e., the waste gas may comprise no oxygen.

Preferably, the waste gas has a composition which is not explosive, in particular with regard to oxygen, more preferably when entering the regenerative thermal oxidizer.

The waste gas may be undiluted when entering the regenerative thermal oxidizer. Preferably, the waste gas is undiluted by air when entering the regenerative thermal oxidizer. The waste gas may have substantially the same composition when exiting the waste gas source and when entering the regenerative thermal oxidizer.

The regenerative thermal oxidizer may comprise a heater. The heater may be configured to heat at least a portion of the regenerative thermal oxidizer. The heater may comprise a burner and/or an electrical heating element.

The heater may be configured to heat the reaction chamber and/or the beds of the regenerative thermal oxidizer.

The burner may be operated by fuel, for example a fuel gas. The fuel gas may comprise at least one hydrocarbon and/or hydrogen. Preferably, the fuel gas comprises hydrogen. The burner may be supplied with oxygen, for example with air, additionally separately or independently from the oxygen-containing gas supplied to the regenerative thermal oxidizer used to oxidize the at least one oxidizable compound in the waste gas.

The electrical heating element may be a resistive heating element. The electrical heating element may be supplied with electrical energy from a renewable energy source. The renewable energy source may be wind energy or solar energy.

During a start-up cycle, the heater may heat the regenerative thermal oxidizer to a start temperature. For example, the reaction chamber and/or the beds may be heated to the start temperature. The first, second and/or third cycles may be performed after the start-up cycle.

Preferably, the heater is not operated during the first, second and/or third cycles. Alternatively, the heater may be operated during the first, second and/or third cycles.

During the start-up cycle, the heater may be controlled such that regenerative thermal oxidizer is heated to a predetermined temperature. No waste gas may be directed to the regenerative thermal oxidizer, preferably to the reaction chamber of the regenerative thermal oxidizer, during the start-up cycle.

During a first cycle, the herein presented method may comprise: Directing the waste gas through the first bed of the first transfer chamber of the regenerative thermal oxidizer to the reaction chamber of the regenerative thermal oxidizer, such that the waste gas is preheated by the first bed. During the first cycle, the herein presented method may comprise: Directing the oxygen-containing gas to the regenerative thermal oxidizer, such that the oxygen-containing gas enters the regenerative thermal oxidizer downstream of at least a portion of the first bed. During a second cycle, the herein presented method may comprise: Directing the waste gas through a second bed of a second transfer chamber of the regenerative thermal oxidizer to the reaction chamber of the regenerative thermal oxidizer, such that the waste gas is preheated by the second bed. During the second cycle, the herein presented method may comprise: Directing the oxygen-containing gas to the regenerative thermal oxidizer, such that the oxygen-containing gas enters the regenerative thermal oxidizer downstream of at least a portion of the second bed.

The waste gas and the oxygen-containing gas may be mixed in the regenerative thermal oxidizer to allow oxidation of the oxidizable compound of the waste gas by oxygen of the oxygen-containing gas.

A flow rate of the oxygen-containing gas into the regenerative thermal oxidizer may be controlled based on at least one of a composition of the waste gas and a flow rate of the waste gas. Preferably the flow rate of the oxygen-containing gas into the regenerative thermal oxidizer may be controlled based on both the composition of the waste gas and the flow rate of the waste gas.

The composition of the waste gas may be measured by one or more sensors. The flow rate of the waste gas may be measured by one or more sensors.

Specifically, the flow rate of the oxygen-containing gas into the regenerative thermal oxidizer may be controlled such that the amount of oxygen introduced into the regenerative thermal oxidizer is sufficient to oxidize the at least one oxidizable compound of the waste gas.

BRIEF DESCRIPTION OF THE DRAWINGS

The above-mentioned attributes and other features and advantages of the present disclosure and the manner of attaining them will become more apparent and the present disclosure itself will be better understood by reference to the following description of embodiments of the present technique taken in conjunction with the accompanying drawings, wherein.

Figure 1:
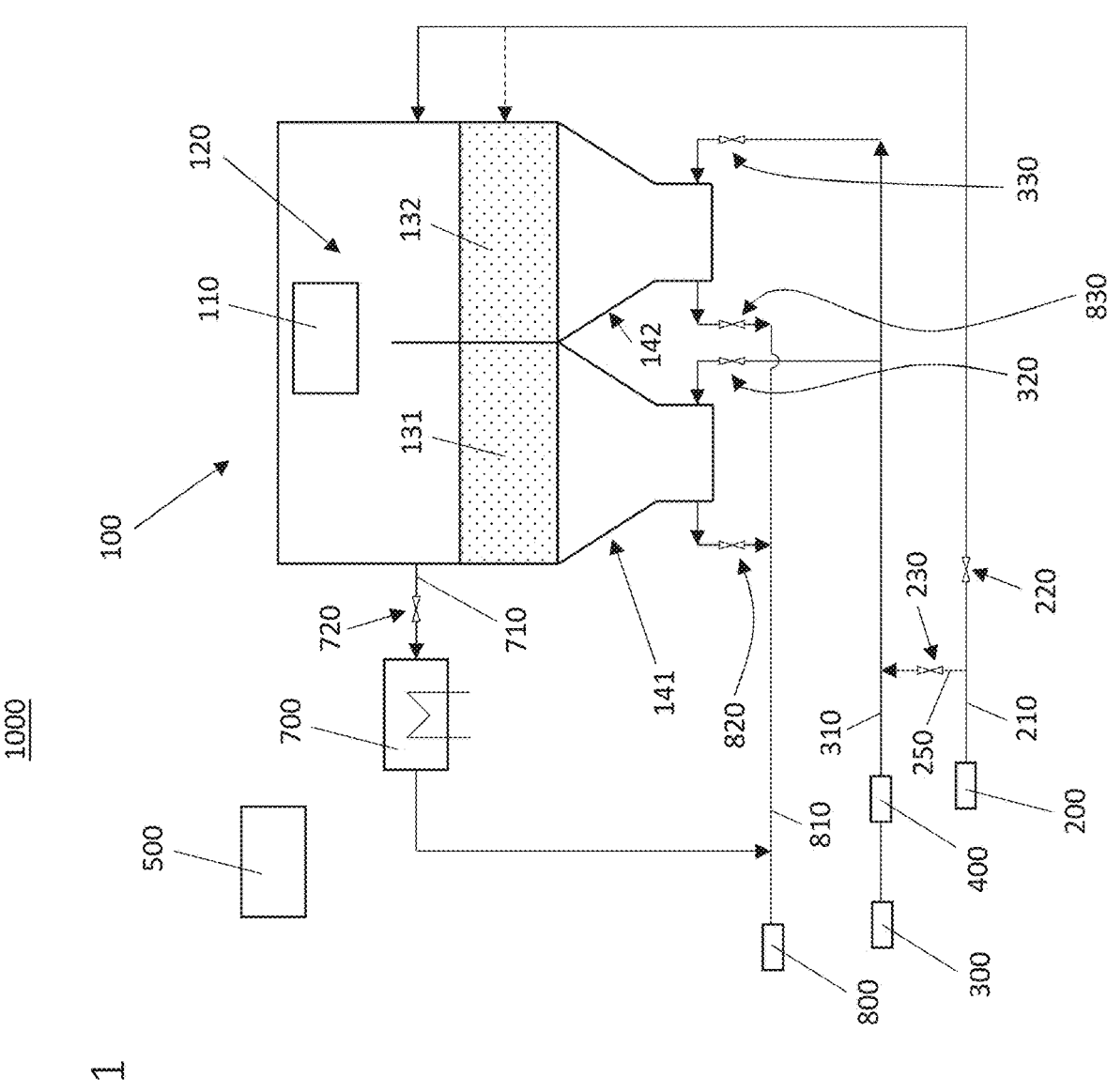
FIG. 1 shows a system 1000 according to an embodiment.

Hereinafter, above-mentioned and other features of the present disclosure are described in detail. Various embodiments are described with reference to the drawings, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the disclosure. It may be evident that such embodiments may be practiced without these specific details.

It may be noted that terms like "first", "second" and "third" are merely used to distinguishing elements, not to count elements. For example, when a "second" element is addressed, this does not imply that a "first" element must be present.

FIG. 1 schematically shows a system 1000. The system 1000 may comprise a regenerative thermal oxidizer 100.

The regenerative thermal oxidizer 100 may comprise a first transfer chamber 141 and a second transfer chamber 142. The first transfer chamber 141 may include a first bed 131. The second transfer chamber 142 may include a second bed 132. The first transfer chamber 141 and the second transfer chamber 142 may be in fluid flow communication with a reaction chamber 120 of the regenerative thermal oxidizer 100.

The first transfer chamber 141 and the second transfer chamber 142 may be physically separated such that the first bed 131 and the second bed 132 are physically separated from each other. The separation can be achieved by a wall which extends in the regenerative thermal oxidizer 100. At one side, the first transfer chamber 141 and the second transfer chamber 142 may be open, preferably towards the reaction chamber 120.

The extension of the wall separating the first bed 131 and the second bed 132 may define an upper end of the first transfer chamber 141 and the second transfer chamber 142.

For example, an end of the wall separating the first bed 131 and the second bed 132 may define the end of the first transfer chamber 141 and the second transfer chamber 142.

The reaction chamber 120 may be present immediately adjacent to the first transfer chamber 141 and to the second transfer chamber 142.

The regenerative thermal oxidizer 100 may comprise a heater 110. The heater 110 may be used to heat at least a portion of the regenerative thermal oxidizer 100. For example, the reaction chamber 120 may be heated by the heater 110. Alternatively or additionally, the first bed 131 and the second bed 132 may be heated by the heater 110. The heater 110 may be a burner or an electrical heater.

The system 1000 may comprise a controller 500. The controller 500 may be configured to control the overall operation of the system 1000. The controller 500 may be configured to control the overall operation of the regenerative thermal oxidizer 100. The controller 500 may be located in an overall control station (not shown) of the system 1000. The controller 500 may be a part of a controlling computer of the system 1000.

The system 1000 may comprise an oxygen-containing gas tube 210. The oxygen-containing gas tube 210 may connect an oxygen-containing gas source 200 with the regenerative thermal oxidizer 100. Oxygen-containing gas may flow from the oxygen-containing gas source 200 via the oxygen-containing gas tube 210 to the regenerative thermal oxidizer 100. For example, the regenerative thermal oxidizer 100 may include one or more oxygen-containing gas inlet 145, 146, 147, 148, as will be described in more detail with reference to FIGS. 3a and 3b.

Preferably, one or more first oxygen-containing gas inlet 145, 146, 147, 148 corresponds to the first transfer chamber 141 and/or one or more second oxygen-containing gas inlet 145, 146, 147, 148 corresponds to the second transfer chamber 142.

The one or more first oxygen-containing gas inlet 145, 146, 147, 148 may be positioned such that the oxygen-containing gas enters the first bed 131 (indicated by a dashed arrow in FIG. 1). Also, the one or more first oxygen-containing gas inlet 145, 146, 147, 148 may be positioned such that the oxygen-containing gas enters the regenerative thermal oxidizer 100 outside the first bed 131 (indicated by a solid arrow in FIG. 1).

The oxygen-containing gas tube 210 may comprise at least one valve 220. When the valve 220 is open, oxygen-containing gas may flow from the oxygen-containing gas source 200 to the regenerative thermal oxidizer 100. When the valve 220 is closed, oxygen-containing gas may not flow from the oxygen-containing gas source 200 to the regenerative thermal oxidizer 100. Preferably, the oxygen-containing gas tube 210 comprises a first valve and a second valve. When the first valve is open, oxygen-containing gas may flow from the oxygen-containing gas source 200 to the first transfer chamber 141. When the first valve is closed, oxygen-containing gas may not flow from the oxygen-containing gas source 200 to the first transfer chamber 141. When the second valve is open, oxygen-containing gas may flow from the oxygen-containing gas source 200 to the second transfer chamber 142. When the second valve is closed, oxygen-containing gas may not flow from the oxygen-containing gas source 200 to the second transfer chamber 142.

A pressure unit (not shown) may be disposed along the oxygen-containing gas tube 210 to force the oxygen-containing gas to the regenerative thermal oxidizer 100, in particular to the first transfer chamber 141 and/or to the second transfer chamber 142. The oxygen-containing gas source 200 may be surrounding air. The pressure unit may be a blower.

The system 1000 may comprise a waste gas tube 310. The waste gas tube 310 may connect a waste gas source 300 and the first transfer chamber 141 and the second transfer chamber 142. Waste gas may flow from the waste gas source 300 via the waste gas tube 310 to the regenerative thermal oxidizer 100, in particular to the first transfer chamber 141 and/or to the second transfer chamber 142.

The waste gas tube 310 may comprise at least a first valve 320. The waste gas tube 310 may comprise at least a second valve 330. When the first valve 320 is open, waste gas may flow from the waste gas source 300 to the first transfer chamber 141. When the first valve 320 is closed, waste gas may not flow from the waste gas source 300 to the first transfer chamber 141. When the second valve 330 is open, waste gas may flow from the waste gas source 300 to the second transfer chamber 142. When the second valve 330 is closed, waste gas may not flow from the waste gas source 300 to the second transfer chamber 142.

The pressure at the waste gas source 300 may be higher than at the first transfer chamber 141 and/or the second transfer chamber 142. Also, a pressure unit (not shown) may be disposed along the waste gas tube 310 to force the waste gas to the first transfer chamber 141 and/or to the second transfer chamber 142. The pressure unit may be a blower. The waste gas source 300 may be an exit or an outlet of a gas treatment unit, for example a sulfur recovery unit.

A gas-liquid separation unit 400, for example a knock-out drum or demister, may be disposed along the waste gas tube 310. The gas-liquid separation unit 400 may separate and/or remove liquid components in the waste gas. Preferably, the gas-liquid separation unit 400 is positioned close to the waste gas source 300.

A connection tube 250 may be connected to the waste gas tube 310 and to the oxygen-containing gas tube 210. The connection tube 250 may comprise a valve 230. When the valve 230 is open, oxygen-containing gas may flow from the oxygen-containing gas tube 210 to the waste gas tube 310.

The system 1000 may comprise a flue gas tube 810. As will be described in more details below, an oxidizable compound of the waste gas may be oxidized in the reaction chamber 120 of the regenerative thermal oxidizer 100 by oxygen of the oxygen-containing gas. By oxidizing the oxidizable compound, flue gas may be produced in the reaction chamber 120.

The flue gas tube 810 may connect the first transfer chamber 141 and/or the second transfer chamber 142 with a flue gas outlet 800. Flue gas may flow from the regenerative thermal oxidizer 100, in particular from the reaction chamber 120 of the regenerative thermal oxidizer 100 or from the first transfer chamber 141 and/or from the second transfer chamber 142, via the flue gas tube 810 to the flue gas outlet 800.

The flue gas tube 810 may comprise at least a first valve 820. The flue gas tube 810 may comprise at least a second valve 830. When the first valve 820 is open, flue gas may flow from the first transfer chamber 141 to the flue gas outlet 800. When the first valve 820 is closed, flue gas may not flow from the first transfer chamber 141 to the flue gas outlet 800. When the second valve 830 is open, flue gas may flow from the second transfer chamber 142 to the flue gas outlet 800. When the second valve 830 is closed, flue gas may not flow from the second transfer chamber 142 to the flue gas outlet 800. The flue gas outlet 800 may be the environment of the regenerative thermal oxidizer 100. Thus, flue gas may be released to the environment.

The pressure in the first transfer chamber 141 and/or the second transfer chamber 142 may be higher than the pressure at the flue gas outlet 800. Also, the flue gas tube 810 may comprise a pressure unit (not shown) to force the flue gas towards the flue gas outlet 800. The pressure unit may be a blower.

The system 1000 may comprise a bypass tube 710. The bypass tube 710 may connect a heat exchanger 700 with the regenerative thermal oxidizer 100, in particular with the reaction chamber 120 of the regenerative thermal oxidizer 100. Gas may flow from the regenerative thermal oxidizer 100, in particular from the reaction chamber 120 of the regenerative thermal oxidizer 100 to the heat exchanger 700. The gas may be flue gas.

The gas may be cooled in the heat exchanger 700. For example, the heat exchanger 700 may be configured to transfer (thermal) energy from the gas to the waste gas prior to entry of the waste gas into the regenerative thermal oxidizer, to the oxygen-containing gas prior to entry of the oxygen-containing gas into the regenerative thermal oxidizer, to a heat recovery system and/or to a superheater.

The bypass tube 710 may comprise at least one valve 720. When the valve 720 is open, gas may flow from the regenerative thermal oxidizer 100 to the heat exchanger 700. When the valve 720 is closed, gas may not flow from the regenerative thermal oxidizer 100 to the heat exchanger 700.

The pressure in the regenerative thermal oxidizer 100 may be higher than the pressure in the heat exchanger. Also, a pressure unit (not shown) may be disposed along the bypass tube 710 to force the gas from the regenerative thermal oxidizer 100 to the heat exchanger. The pressure unit may be a blower.

The heat exchanger 700 may be connected to the flue gas tube 810. Gas exiting the heat exchanger may be introduced into the flue gas tube 810.

Figure 2:
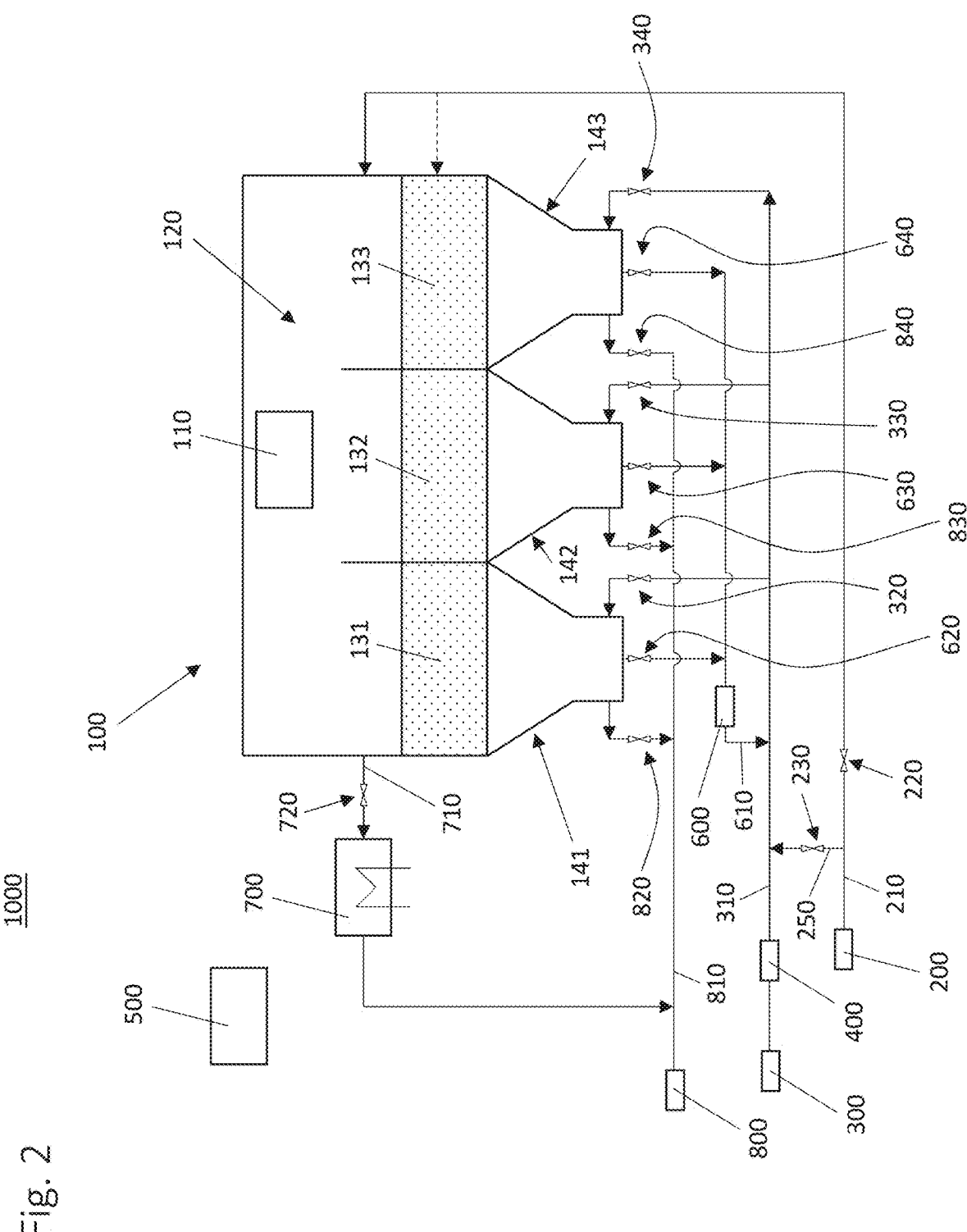
FIG. 2 shows a system 1000 according to an embodiment.

FIG. 2 schematically shows a system 1000. Some of the components of the system 1000 shown in FIG. 2 are equal to the same components of the system shown in FIG. 1. In the following, differences between FIG. 1 and FIG. 2 will be described.

The system 1000 may comprise a regenerative thermal oxidizer 100. The regenerative thermal oxidizer 100 may comprise a first transfer chamber 141, a second transfer chamber 142 and a third transfer chamber 143. The first transfer chamber 141 may include a first bed 131. The second transfer chamber 142 may include a second bed 132. The third transfer chamber 143 may include a third bed 133. The first transfer chamber 141, the second transfer chamber 142 and the third transfer chamber 143 may be in fluid flow communication with a reaction chamber 120 of the regenerative thermal oxidizer 100.

The first transfer chamber 141, the second transfer chamber 142 and the third transfer chamber 143 may be physically separated such that the first bed 131, the second bed 132 and the third bed 133 are physically separated from each other. The separation can be achieved by one or more walls which extend in the regenerative thermal oxidizer 100. For example, the first transfer chamber 141 and the second transfer chamber 142 may be separated by a first wall. The second transfer chamber 142 and the third transfer chamber 143 may be separated by a second wall.

The heater 110 may be configured to heat the reaction chamber 120. Alternatively or additionally, the first bed 131, the second bed 132 and the third bed may be heated by the heater 110.

The system 1000 may comprise an oxygen-containing gas tube 210. The oxygen-containing gas tube 210 may connect an oxygen-containing gas source 200 with the regenerative thermal oxidizer 100. One or more first oxygen-containing gas inlet 145, 146, 147, 148 may correspond to the first transfer chamber 141. One or more second oxygen-containing gas inlet 145, 146, 147, 148 may correspond to the second transfer chamber 142. One or more third oxygen-containing gas inlet 145, 146, 147, 148 may correspond to the third transfer chamber 142.

The oxygen-containing gas tube 210 may comprise a first valve, a second valve and a third valve. When the first valve is open, oxygen-containing gas may flow from the oxygen-containing gas source 200 to the first transfer chamber 141. When the first valve is closed, oxygen-containing gas may not flow from the oxygen-containing gas source 200 to the first transfer chamber 141. When the second valve is open, oxygen-containing gas may flow from the oxygen-containing gas source 200 to the second transfer chamber 142. When the second valve is closed, oxygen-containing gas may not flow from the oxygen-containing gas source 200 to the second transfer chamber 142. When the third valve is open, oxygen-containing gas may flow from the oxygen-containing gas source 200 to the third transfer chamber 143. When the third valve is closed, oxygen-containing gas may not flow from the oxygen-containing gas source 200 to the third transfer chamber 143.

The one or more first oxygen-containing gas inlet 145, 146, 147, 148 may be positioned such that the oxygen-containing gas enters the first bed 131 (indicated by a dashed arrow in FIG. 2). Also, the one or more first oxygen-containing gas inlet 145, 146, 147, 148 may be positioned such that the oxygen-containing gas enters the regenerative thermal oxidizer 100 outside the first bed 131 (indicated by a solid arrow in FIG. 2).

The system 1000 may comprise a waste gas tube 310. The waste gas tube 310 may connect a waste gas source 300 and the first transfer chamber 141, the second transfer chamber 142 and the third transfer chamber 143.

The waste gas tube 310 may comprise at least a first valve 320, at least a second valve 330, and at least a third valve 340. When the first valve 320 is open, waste gas may flow from the waste gas source 300 to the first transfer chamber 141. When the first valve 320 is closed, waste gas may not flow from the waste gas source 300 to the first transfer chamber 141. When the second valve 330 is open, waste gas may flow from the waste gas source 300 to the second transfer chamber 142. When the second valve 330 is closed, waste gas may not flow from the waste gas source 300 to the second transfer chamber 142. When the third valve 340 is open, waste gas may flow from the waste gas source 300 to the third transfer chamber 143. When the third valve 340 is closed, waste gas may not flow from the waste gas source 300 to the third transfer chamber 143.

The system 1000 may comprise a flue gas tube 810. The flue gas tube 810 may connect the first transfer chamber 141, the second transfer chamber 142 and/or the third transfer chamber 143 with a flue gas outlet 800.

The flue gas tube 810 may comprise at least a first valve 820, at least a second valve 830 and at least a third valve 840. When the first valve 820 is open, flue gas may flow from the first transfer chamber 141 to the flue gas outlet 800. When the first valve 820 is closed, flue gas may not flow from the first transfer chamber 141 to the flue gas outlet 800. When the second valve 830 is open, flue gas may flow from the second transfer chamber 142 to the flue gas outlet 800. When the second valve 830 is closed, flue gas may not flow from the second transfer chamber 142 to the flue gas outlet 800. When the third valve 840 is open, flue gas may flow from the third transfer chamber 143 to the flue gas outlet 800. When the third valve 840 is closed, flue gas may not flow from the third transfer chamber 143 to the flue gas outlet 800.

The system may comprise a purge tube 610. The purge tube 610 may connect the waste gas tube 310 with the first transfer chamber 141, the second transfer chamber 142 and the third transfer chamber 143. Gas, preferably flue gas, may flow from the first transfer chamber 141, the second transfer chamber 142 and/or the third transfer chamber 143 to the waste gas tube 310.

The purge tube 610 may comprise a first valve 620, a second valve 630 and a third valve 640. When the first valve 620 is open, gas may flow from the first transfer chamber 141 to the waste gas tube 310. When the first valve 620 is closed, gas may not flow from the first transfer chamber 141 to the waste gas tube 310. When the second valve 630 is open, gas may flow from the second transfer chamber 142 to the waste gas tube 310. When the second valve 630 is closed, gas may not flow from the second transfer chamber 142 to the waste gas tube 310. When the third valve 640 is open, gas may flow from the third transfer chamber 143 to the waste gas tube 310. When the third valve 640 is closed, gas may not flow from the third transfer chamber 143 to the waste gas tube 310.

The purge gas tube 610 may comprise a pressure unit 600 to force the gas towards the waste gas tube 310.

Figure 3A:
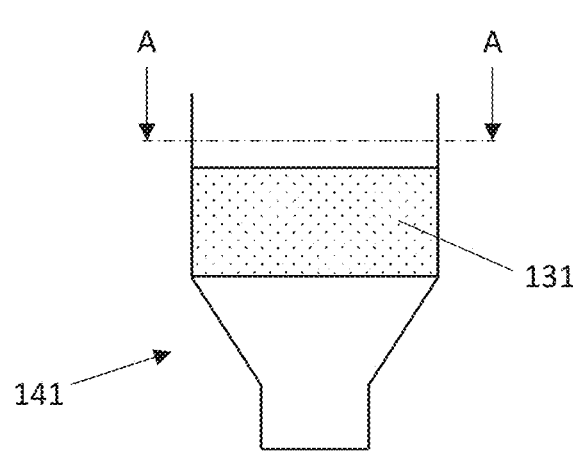
FIG. 3*a* shows a transfer chamber 141.

FIG. 3a schematically shows a transfer chamber of a regenerative thermal oxidizer 100. The transfer chamber will be described with reference to the first transfer chamber 141. Other transfer chambers of the regenerative thermal oxidizer, for example the second transfer chamber 142 and/or the third transfer chamber 143 may be designed in a similar or equal or equivalent way.

Figure 3B:
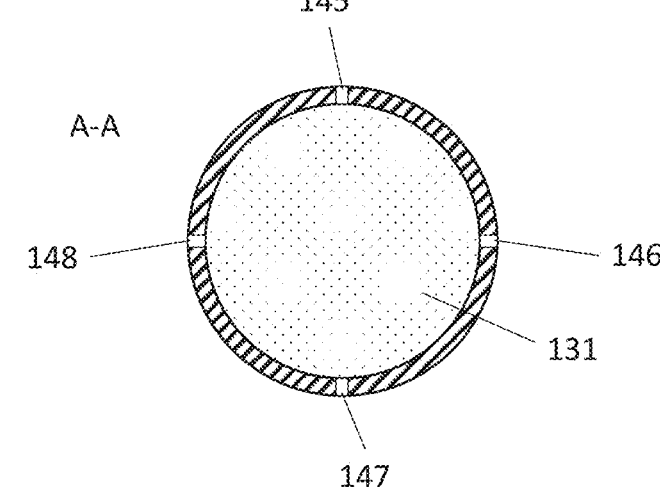
FIG. 3*b* shows a cross section view of the transfer chamber 141.

The first transfer chamber 141 comprises a bed 131. In FIG. 3a, a cut plane is indicated. The corresponding cross section view is shown in FIG. 3b.

The first transfer chamber 141 may have a circular or polygonal cross section. The polygonal cross section may be rectangular or square. The cross section may be oriented in a plane perpendicular to a flow direction of the waste gas through the first transfer chamber 141.

The first transfer chamber 141 may comprise an oxygen-containing gas inlet 145. The oxygen-containing gas inlet 145 may be a bore or a hole in the first transfer chamber 141, preferably in a side wall of the first transfer chamber 141. The oxygen-containing gas inlet 145 may comprise a nozzle.

When waste gas flows through the first bed 131 of the first transfer chamber 141 towards the reaction chamber 120 of the regenerative thermal oxidizer 100, the oxygen-containing gas inlet 145 may be formed downstream of at least a portion of the first bed 131.

The first transfer chamber 141 may comprise two oxygen-containing gas inlets 145, 146. Preferably the first transfer chamber 141 comprises three oxygen-containing gas inlets 145, 146, 147, more preferably the first transfer chamber 141 comprises four oxygen-containing gas inlets 145, 146, 147, 148, more preferably the first transfer chamber 141 comprises more than four oxygen-containing gas inlets (not shown).

The one or more oxygen-containing gas inlets 145, 146, 147, 148 may be evenly or non-evenly distributed along a circumference of the first transfer chamber 141.

A distance between at least a portion of the first bed 131 and a first oxygen-containing gas inlet 145 may be the same as a distance between at least a portion of the first bed 131 and a second oxygen-containing gas inlet 146. Each of the oxygen-containing gas inlets 145, 146, 147, 148 may have the same distance to the first bed 131. In general, the distance may be a distance in the flow direction of waste gas through the first transfer chamber 141.

A distance between one or more of the oxygen-containing gas inlets 145, 146, 147, 148 and at least a portion of the first bed 131 may be different than a distance of at least another one of the oxygen-containing gas inlets 145, 146, 147, 148 and the first bed 131.

Figure 4:
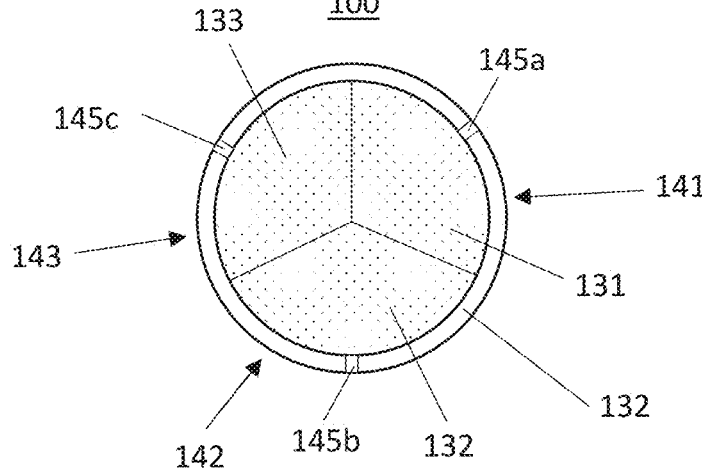
FIG. 4 shows a regenerative thermal oxidizer 100.

FIG. 4 schematically shows a regenerative thermal oxidizer 100 which functions in a similar way as the regenerative thermal oxidizer 100 as shown in FIG. 2 and as described with reference to FIG. 2.

The regenerative thermal oxidizer 100 may comprise a first transfer chamber 141, a second transfer chamber 142 and a third transfer chamber 143. The first transfer chamber 141 may comprise a first bed 131. The second transfer chamber 142 may comprise a second bed 132. The third transfer chamber 143 may comprise a third bed 133.

The first bed 131 may be positioned (directly) adjacent or between the second bed 132 and the third bed 133. The second bed 132 may be positioned (directly) adjacent or between the third bed 133 and the first bed 131. The third bed 133 may be positioned (directly) adjacent or between the first bed 131 and the second bed 132.

The regenerative thermal oxidizer 100 may comprise a housing 150. The housing 150 may have a substantially cylindrical shape or a substantially circular cross section. The first bed 131, the second bed 132 and the third bed 133 may be positioned in the housing 150.

The first transfer chamber 141 may comprise one or more first oxygen-containing gas inlet 145a. The second transfer chamber 142 may comprise one or more second oxygen-containing gas inlet 145b. The third transfer chamber 143 may comprise one or more oxygen-containing gas inlet 145c.

Figure 5:
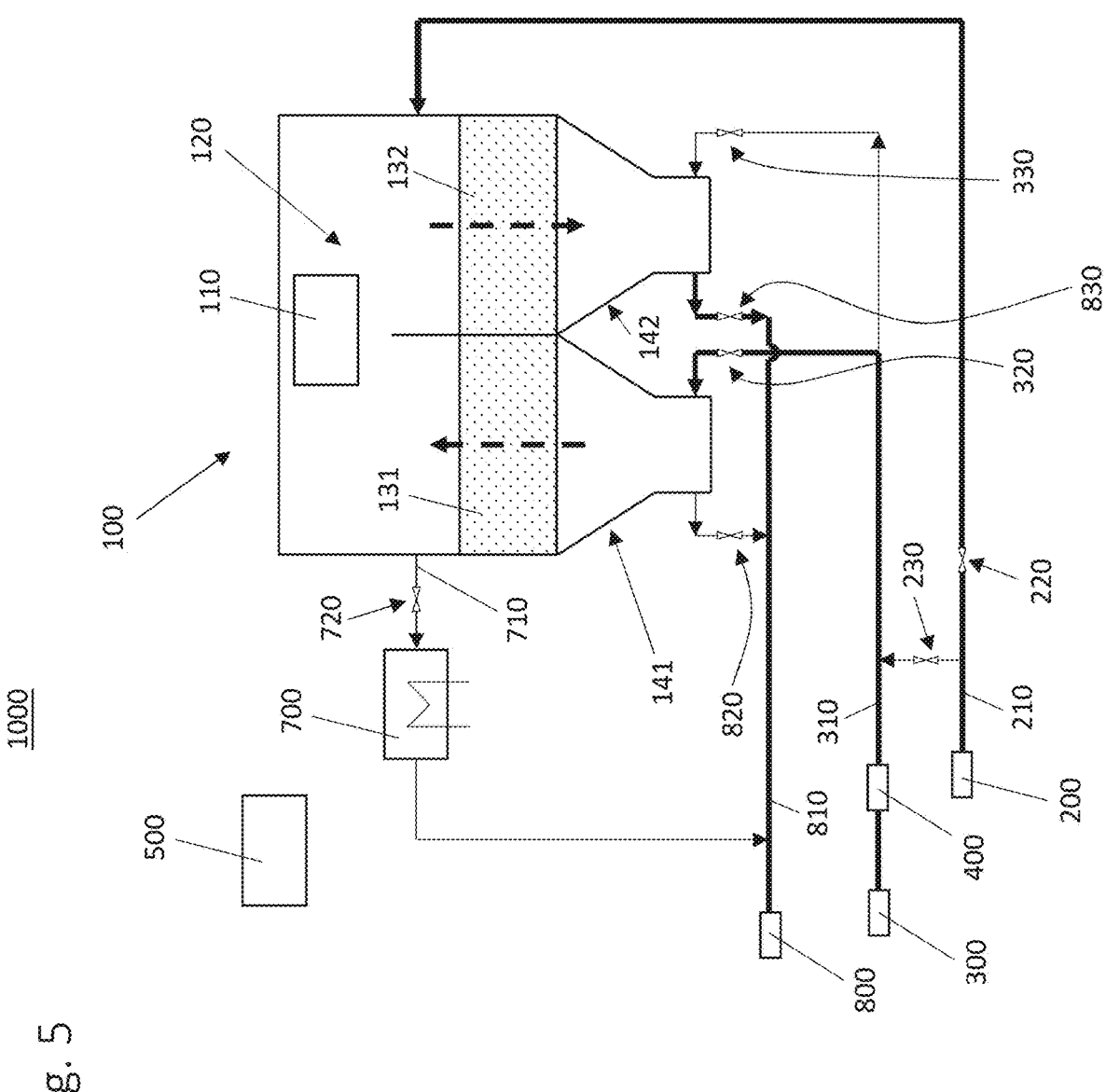
FIG. 5 shows a system 1000 during a first cycle.

FIG. 5 schematically shows a system 1000 during a first cycle. The system 1000 may be similar or equal to the system as shown in FIG. 1 and described with reference to FIG. 1. Flow paths are indicated in the drawings by bold tubes or bold tube sections.

During the first cycle, waste gas may be directed from the waste gas source 300 to the first transfer chamber 141. Waste gas may not be directed to the second transfer chamber 142. For example, valve 320 may be in open state. Valve 330 may be in closed state.

The waste gas may flow through the first bed 131 (indicated by an arrow in FIG. 5). The first bed 131 may have a higher temperature than the waste gas such that the waste gas is preheated. The waste gas may then be directed to the reaction chamber 120 of the regenerative thermal oxidizer 100.

Oxygen-containing gas may be directed from the oxygen-containing gas source 200 to the regenerative thermal oxidizer 100. For example, valve 220 may be in open state and valve 230 may be in closed state. The oxygen-containing gas may enter the regenerative thermal oxidizer 100 downstream of at least a portion of the first bed 131, i.e., the oxygen-containing gas may not flow through the first bed 131. Preferably, the oxygen-containing gas enters the regenerative thermal oxidizer 100 via at least one oxygen-containing gas inlet.

The at least one oxidizable compound in the waste gas may be oxidized in the reaction chamber 120. The oxidation may be a reaction of the at least one oxidizable compound of the waste gas with oxygen of the oxygen-containing gas. Flue gas may be produced by the oxidation in the reaction chamber 120. The flue gas may have a higher temperature than the waste gas. For example, the oxidation may be an exothermic reaction. Thereby, heat may be produced in the reaction chamber 120. Alternatively or additionally, the reaction chamber 120 may be heated by the heater 110. However, preferably, the reaction chamber 120 is not heated by the heater during the first cycle.

The flue gas may be directed from the reaction chamber 120 to the second transfer chamber 142. Specifically, the flue gas may flow through the second bed 132 (indicated by an arrow in FIG. 5) of the second transfer chamber 142. The flue gas may have a higher temperature than the second bed 132. Thus, the second bed 132 may be heated by the flue gas. At the same time, the flue gas may be cooled by the second bed 132.

Flue gas may flow from the second transfer chamber 142 to the flue gas outlet 800. For example, valve 830 may be in open state. Valve 820 may be in closed state. Flue gas may not flow from the first transfer chamber 141 to the flue gas outlet.

Figure 6:
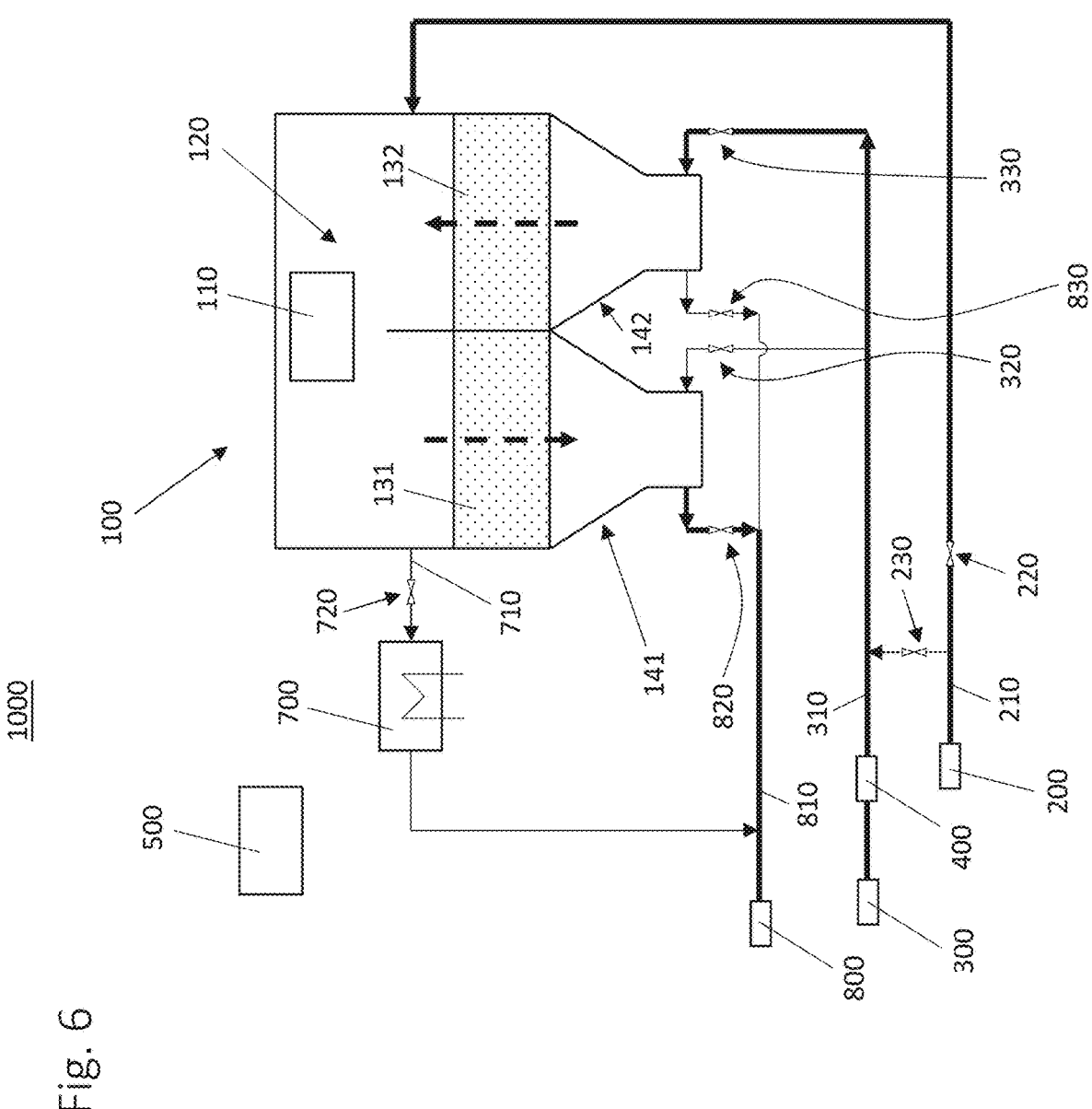
FIG. 6 shows the system 1000 during a second cycle.

FIG. 6 schematically shows the system 1000 during a second cycle. The system 1000 may be similar or equal to the system as shown in FIG. 1 and described with reference to FIG. 1.

During the second cycle, waste gas may be directed from the waste gas source 300 to the second transfer chamber 142. Waste gas may not be directed to the first transfer chamber 141. Valve 320 may be in closed state. Valve 330 may be in open state.

The waste gas may flow through the second bed 132 (indicated by an arrow in FIG. 5). The second bed 132 may have a higher temperature than the waste gas such that the waste gas is preheated. During the first cycle, the second bed received (thermal) energy from the flue gas. During the second cycle, the waste gas is preheated by the previously received (thermal) energy. The waste gas is then directed to the reaction chamber 120 of the regenerative thermal oxidizer 100.

As described with reference to the first cycle, oxygen-containing gas may be directed from the oxygen-containing gas source 200 to the regenerative thermal oxidizer 100. For example, valve 220 may be in open state and valve 230 may be in closed state. The oxygen-containing gas may enter the regenerative thermal oxidizer 100 downstream of at least a portion of the second bed 132, i.e., the oxygen-containing gas may not flow through the second bed 132. Preferably, the oxygen-containing gas enters the regenerative thermal oxidizer 100 via at least one oxygen-containing gas inlet.

Again, the at least one oxidizable compound in the waste gas may be oxidized in the reaction chamber 120 as described with reference to the first cycle.

The flue gas may be directed from the reaction chamber 120 to the first transfer chamber 141. For example, the flue gas may flow through the first bed 131 (indicated by an arrow in FIG. 5) of the first transfer chamber 141. The flue gas may have a higher temperature than the first bed 131. Thus, the second bed 132 may be heated by the flue gas and/or the flue gas may be cooled by the first bed 131.

The flue gas may flow from the first transfer chamber 141 to the flue gas outlet 800. For example, valve 820 may be in open state. Valve 830 may be in closed state. Flue gas may not flow from the second transfer chamber 142 to the flue gas outlet 800.

The first cycle and the second cycle may be performed alternately. A second cycle may be performed after a first cycle, and a first cycle may be performed after a second cycle, etc. Between the first cycle and the second cycle, another cycle may or may not be performed.

During the first cycle and/or during the second cycle, flue gas may flow from the reaction chamber 120 to the heat exchanger 700. For example, valve 720 may be in open state. The flue gas may flow to the heat exchanger 700 via bypass tube 710. The flue gas may be cooled in the heat exchanger 700. The cooled flue gas may flow to flue gas tube 810.

Figure 7:
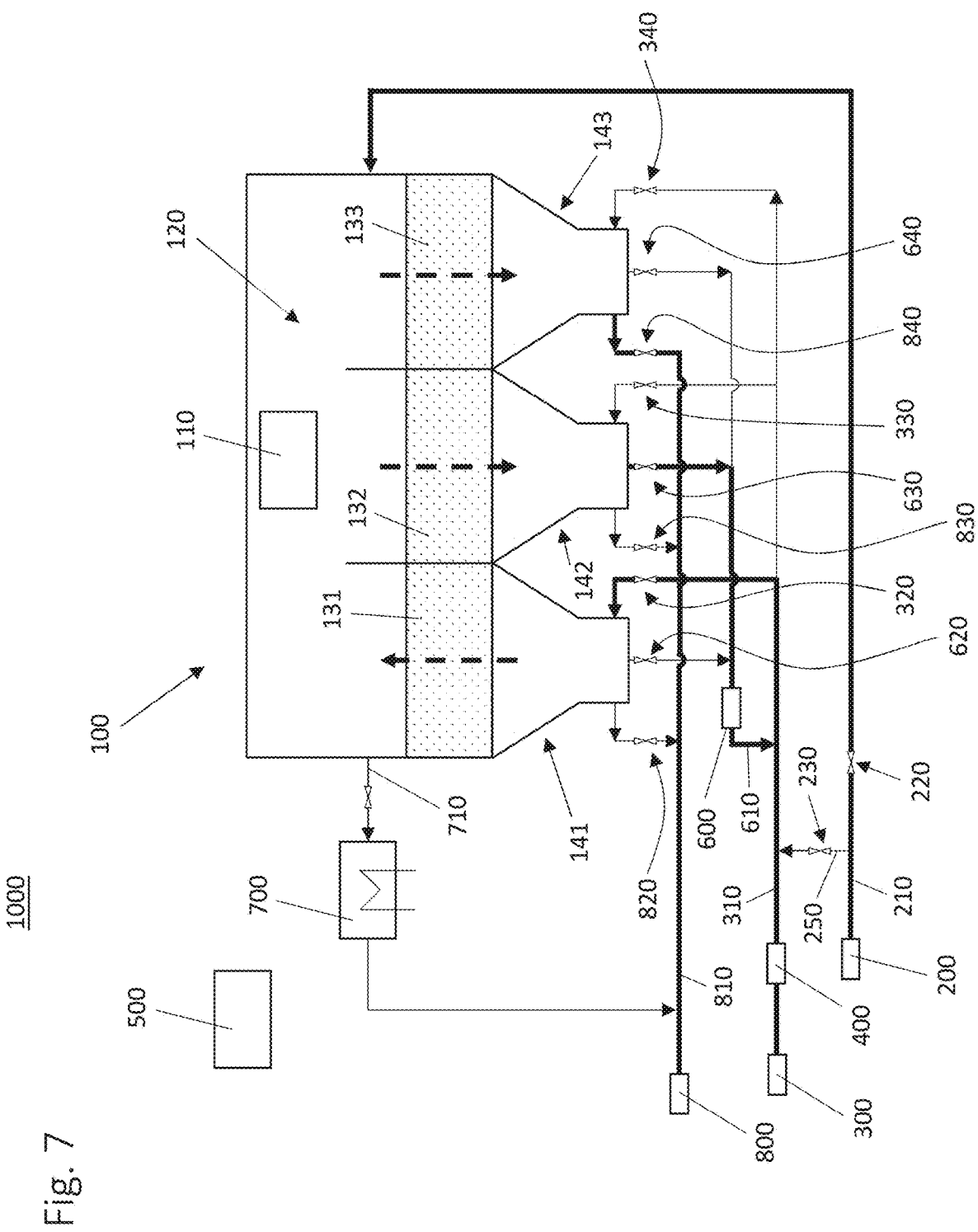
FIG. 7 shows a system 1000 during a first cycle.

FIG. 7 schematically shows a system 1000 during a first cycle. The system 1000 may be similar or equal to the system as shown in FIG. 2 and described with reference to FIG. 2. Flow paths are indicated in the drawings by bold tubes or bold tube sections.

During the first cycle, waste gas may be directed from the waste gas source 300 to the first transfer chamber 141. Waste gas may not be directed to the second transfer chamber 142. Also, waste gas may not be directed to the third transfer chamber 143. For example, valve 320 may be in open state. Valve 330 may be in closed state. Valve 340 may be in closed state.

The waste gas may flow through the first bed 131 (indicated by an arrow in FIG. 7). The first bed 131 may have a higher temperature than the waste gas such that the waste gas is preheated. The waste gas may then be directed to the reaction chamber 120 of the regenerative thermal oxidizer 100.

Oxygen-containing gas may be directed from the oxygen-containing gas source 200 to the regenerative thermal oxidizer 100. For example, valve 220 may be in open state. Valve 230 may be in closed state. The oxygen-containing gas may enter the regenerative thermal oxidizer 100 downstream of at least a portion of the first bed 131, i.e., the oxygen-containing gas may not flow through the first bed 131, the second bed 132 and/or the third bed 133. Preferably, the oxygen-containing gas enters the regenerative thermal oxidizer 100 via at least one oxygen-containing gas inlet.

The at least one oxidizable compound in the waste gas may be oxidized in the reaction chamber 120. The oxidization may be a reaction of the at least one oxidizable compound of the waste gas with oxygen of the oxygen-containing gas. Flue gas may be produced by the oxidation in the reaction chamber 120. The flue gas may have a higher temperature than the waste gas. For example, the oxidation may be an exothermic reaction. Thereby, heat may be produced in the reaction chamber 120. Alternatively or additionally, the reaction chamber 120 may be heated by the heater 110. However, preferably, the reaction chamber 120 is not heated by the heater during the first cycle.

A portion of the flue gas may be directed from the reaction chamber 120 to the second transfer chamber 142. Preferably, the flue gas may flow through the second bed 132 (indicated by an arrow in FIG. 7). Flue gas may flow from the second transfer chamber 142 to the purge tube 610. Preferably, the purge tube 610 is not in fluid flow communication with the first transfer chamber 141 and/or with the third transfer chamber 143 during the first cycle. For example, valve 630 may be in open state. Valve 620 may be in closed state. Valve 640 may be in closed state.

The flue gas may flow from the purge tube 610 to the waste gas tube 310. From the waste gas tube 310, the flue gas may enter the first transfer chamber 141, preferably together with waste gas. By directing a portion of the flue gas through the second transfer chamber 142, the second transfer chamber 142 may be purged or flushed.

Alternatively, oxygen-containing gas or another gas may be used to purge or flush the second transfer chamber 142. In this case, oxygen-containing gas or another gas may be directed to the second transfer chamber 142 and through the second bed 132 to the reaction chamber 120.

A portion of the flue gas may be directed from the reaction chamber 120 to the third transfer chamber 143. The flue gas may flow through the third bed 133 (indicated by an arrow in FIG. 7) of the third transfer chamber 143. The flue gas may have a higher temperature than the third bed 133. Thus, the third bed 133 may be heated by the flue gas and/or the flue gas may be cooled by the third bed 133.

Flue gas may flow from the third transfer chamber 143 to the flue gas outlet 800. For example, valve 840 may be in open state. Valve 820 may be in closed state. Valve 830 may be in closed state. Flue gas may not flow from the first transfer chamber 141 and/or from the second transfer chamber 142 to the flue gas outlet 800.

The portion of the flue gas that is directed through the second bed 132 may be smaller than the portion of the flue gas that is directed through the third bed 133. For example, less than 50% of the flue gas, preferably less than 40% of the flue gas, more preferably less than 30% of the flue gas, more preferably less than 20% of the flue gas, more preferably less than 10% of the flue gas, may be directed through the second bed 132. The relative values (percentage values) are based on the total amount of flue gas that flows through the second bed 132 and the third bed 133.

Figure 8:
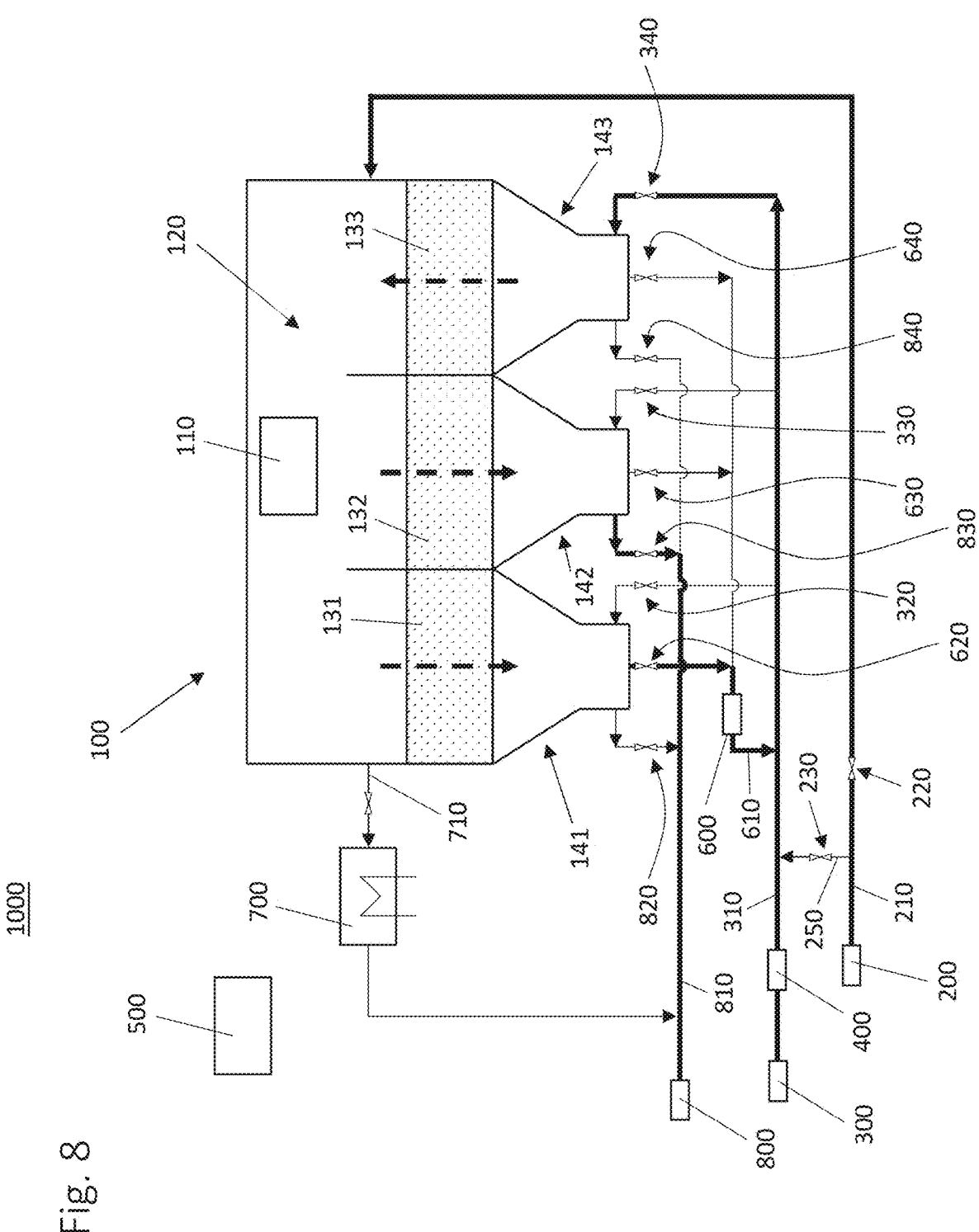
FIG. 8 shows the system 1000 during a second cycle.

FIG. 8 schematically shows the system 1000 during a second cycle. The system 1000 may be similar or equal to the system as shown in FIG. 2 and described with reference to FIG. 2.

During the second cycle, waste gas may be directed from the waste gas source 300 to the third transfer chamber 143. Waste gas may not be directed to the second transfer chamber 142. Also, waste gas may not be directed to the first transfer chamber 141. For example, valve 340 may be in open state. Valve 330 may be in closed state. Valve 320 may be in closed state.

The waste gas may flow through the third bed 133 to be preheated and may then be directed to the reaction chamber 120 of the regenerative thermal oxidizer 100.

Oxygen-containing gas may be directed from the oxygen-containing gas source 200 to the regenerative thermal oxidizer 100. For example, valve 220 may be in open state. Valve 230 may be in closed state. The oxygen-containing gas may enter the regenerative thermal oxidizer 100 downstream of at least a portion of the third bed 133, i.e., the oxygen-containing gas may not flow through the first bed 131, the second bed 132 and/or the third bed 133. Preferably, the oxygen-containing gas enters the regenerative thermal oxidizer 100 via at least one oxygen-containing gas inlet.

The at least one oxidizable compound in the waste gas may be oxidized in the reaction chamber 120 as described above.

A portion of the flue gas may be directed from the reaction chamber 120 to the first transfer chamber 141. Preferably, the flue gas may flow through the first bed 131. Flue gas may flow from the first transfer chamber 141 to the purge tube 610. Preferably, the purge tube 610 is not in fluid flow communication with the second transfer chamber 142 and/or with the third transfer chamber 143 during the second cycle. For example, valve 620 may be in open state. Valve 630 may be in closed state. Valve 640 may be in closed state.

The flue gas may flow from the purge tube 610 to the waste gas tube 310. From the waste gas tube 310, the flue gas may enter the third transfer chamber 143.

Alternatively, oxygen-containing gas or another gas may be used to purge or flush the first transfer chamber 141.

A portion of the flue gas may be directed from the reaction chamber 120 to the second transfer chamber 142. The flue gas may flow through the second bed 132 of the second transfer chamber 142. The flue gas may have a higher temperature than the second bed 132. Thus, the second bed 132 may be heated by the flue gas and/or the flue gas may be cooled by the second bed 132.

Flue gas may flow from the second transfer chamber 142 to the flue gas outlet 800. For example, valve 830 may be in open state. Valve 820 may be in closed state. Valve 840 may be in closed state. Flue gas may not flow from the first transfer chamber 141 and/or from the third transfer chamber 143 to the flue gas outlet 800.

Figure 9:
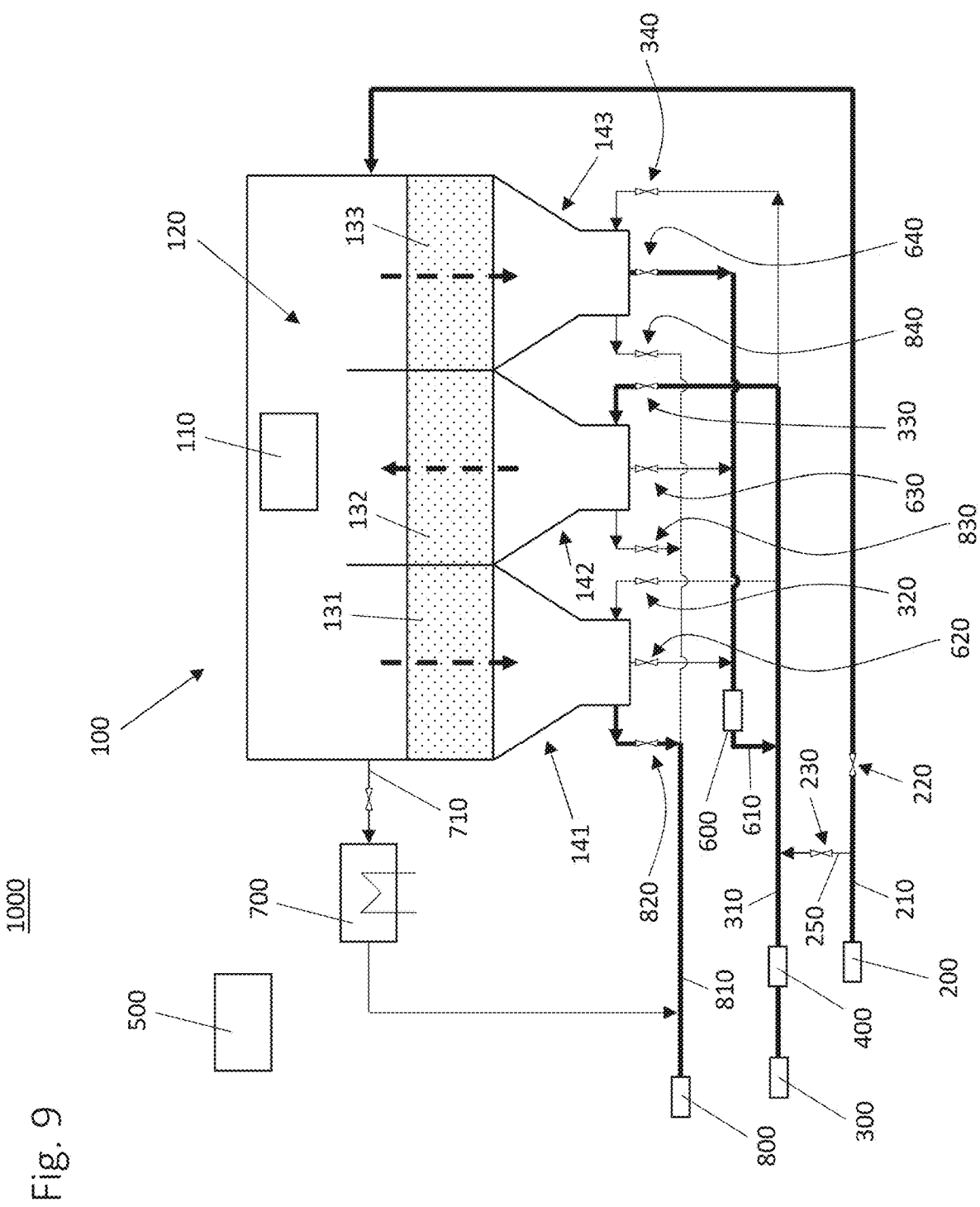
FIG. 9 shows the system 1000 during a third cycle.

FIG. 9 schematically shows the system 1000 during a third cycle. The system 1000 may be similar or equal to the system as shown in FIG. 2 and described with reference to FIG. 2.

During the third cycle, waste gas may be directed from the waste gas source 300 to the second transfer chamber 142. Waste gas may not be directed to the first transfer chamber 141. Also, waste gas may not be directed to the third transfer chamber 143. For example, valve 330 may be in open state. Valve 320 may be in closed state. Valve 340 may be in closed state.

The waste gas may flow through the second bed 132 to be preheated and may then be directed to the reaction chamber 120 of the regenerative thermal oxidizer 100.

Oxygen-containing gas may be directed from the oxygen-containing gas source 200 to the regenerative thermal oxidizer 100. For example, valve 220 may be in open state. Valve 230 may be in closed state. The oxygen-containing gas may enter the regenerative thermal oxidizer 100 downstream of at least a portion of the second bed 132, i.e., the oxygen-containing gas may not flow through the first bed 131, the second bed 132 and/or the third bed 133. Preferably, the oxygen-containing gas enters the regenerative thermal oxidizer 100 via at least one oxygen-containing gas inlet.

The at least one oxidizable compound in the waste gas may be oxidized in the reaction chamber 120 as described above.

A portion of the flue gas may be directed from the reaction chamber 120 to the third transfer chamber 143. Preferably, the flue gas may flow through the third bed 133. Flue gas may flow from the third transfer chamber 143 to the purge tube 610. Preferably, the purge tube 610 is not in fluid flow communication with the first transfer chamber 141 and/or with the second transfer chamber 142 during the third cycle. For example, valve 640 may be in open state. Valve 620 may be in closed state. Valve 630 may be in closed state.

The flue gas may flow from the purge tube 610 to the waste gas tube 310. From the waste gas tube 310, the flue gas may enter the second transfer chamber 142.

Alternatively, oxygen-containing gas or another gas may be used to purge or flush the first transfer chamber 141.

A portion of the flue gas may be directed from the reaction chamber 120 to the first transfer chamber 141. The flue gas may flow through the first bed 131 of the first transfer chamber 141. The flue gas may have a higher temperature than the first bed 131. Thus, the first bed 131 may be heated by the flue gas and/or the flue gas may be cooled by the first bed 131.

Flue gas may flow from the first transfer chamber 141 to the flue gas outlet 800. For example, valve 820 may be in open state. Valve 830 may be in closed state. Valve 840 may be in closed state. Flue gas may not flow from the second transfer chamber 142 and/or from the third transfer chamber 143 to the flue gas outlet 800.

The first cycle, the second cycle and the third cycle may be performed consecutively. First, a first cycle may be performed, then a second cycle may be performed, afterwards a third cycle may be performed. After the third cycle, a first cycle may be performed, etc. Another cycle may or may not be performed between the first cycle and the second cycle or between the second cycle and the third cycle.

During the first cycle, during the second cycle and/or during the third cycle, flue gas may flow from the reaction chamber 120 to the heat exchanger 700. For example, valve 720 may be in open state. The flue gas may flow to the heat exchanger 700 via bypass tube 710. The flue gas may be cooled in the heat exchanger 700. The cooled flue gas may flow to the flue gas tube 810.

For example, the first cycle may include a first subcycle and a second subcycle. During the first subcycle, the oxygen-containing gas and/or the second portion of waste gas may flow through the first bed 131 to the reaction chamber 120, the second bed 132 may be purged or flushed, and flue gas may be directed through the third bed 133 towards the flue gas outlet 800. During the second subcycle, the oxygen-containing gas and/or the second portion of waste gas may flow through the first bed 131 to the reaction chamber 120, the third bed 133 may be purged or flushed, and flue gas may be directed through the second bed 132 towards the flue gas outlet 800.

The second cycle may include a first subcycle and a second subcycle. During the first subcycle, the oxygen-containing gas and/or the second portion of waste gas may flow through the third bed 133 to the reaction chamber 120, the first bed 131 may be purged or flushed, and flue gas may be directed through the second bed 132 towards the flue gas outlet 800. During the second subcycle, the oxygen-containing gas and/or the second portion of waste gas may flow through the third bed 133 to the reaction chamber 120, the second bed 132 may be purged or flushed, and flue gas may be directed through the first bed 131 towards the flue gas outlet 800.

The third cycle may include a first subcycle and a second subcycle. During the first subcycle, the oxygen-containing gas and/or the second portion of waste gas may flow through the second bed 132 to the reaction chamber 120, the third bed 133 may be purged or flushed, and flue gas may be directed through the first bed 131 towards the flue gas outlet 800. During the second subcycle, the oxygen-containing gas and/or the second portion of waste gas may flow through the second bed 132 to the reaction chamber 120, the first bed 131 may be purged or flushed, and flue gas may be directed through the third bed 133 towards the flue gas outlet 800.

Figure 10:
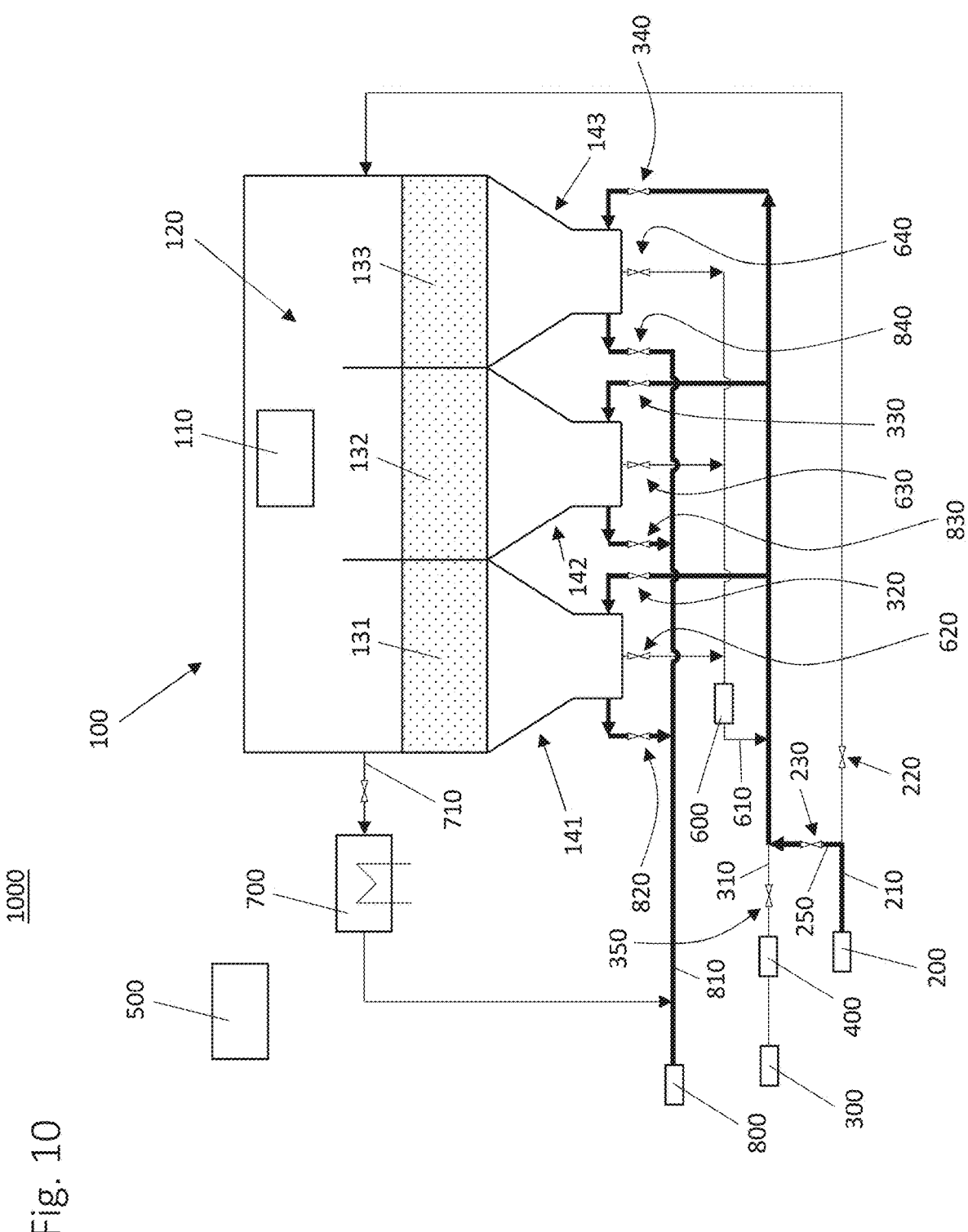
FIG. 10 shows a system 1000 during a start-up cycle.

FIG. 10 schematically shows a system 1000 during a start-up cycle. The system 1000 may be similar or equal to the system as shown in FIG. 2 and described with reference to FIG. 2. Flow paths are indicated in the drawings by bold tubes or bold tube sections.

The system 1000 may comprise a valve 350 positioned along the waste gas tube 310.

During the start-up cycle, the heater 110 may be operated to heat the regenerative thermal oxidizer 100. Preferably, at least the reaction chamber 120 and/or at least one of the first, second and third beds 131, 132, 133 are heated. The heater 110 may be a burner or an electrical heater.

The heater 110 may heat the reaction chamber 120 to a predetermined temperature, e.g., at least 500° C. or at least 800° C. When the predetermined temperature in the reaction chamber 120 is reached, a first cycle, a second cycle or a third cycle as described above may be performed.

During the start-up cycle, a gas may flow through at least one of the first transfer chamber 141, the second transfer chamber 142 and the third transfer chamber 143. The gas may be oxygen-containing gas.

For example, the first transfer chamber 141, the second transfer chamber 142 and/or the third transfer chamber 143 may be in fluid flow communication with the oxygen-containing gas source 200. Valve 220 may be in closed state. Valve 230 may be in open state. Valve 320, valve 330 and/or valve 340 may be in open state. Thereby, oxygen-containing gas may flow from the oxygen-containing gas source 200 to the first transfer chamber 141, the second transfer chamber 142 and/or the third transfer chamber 143.

The gas may flow through at least one of the first transfer chamber 141, the second transfer chamber 142 and/or the third transfer chamber 143 to the reaction room 120. From the reaction room 120, the gas may exit the regenerative thermal oxidizer 100 by flowing through at least one of the first transfer chamber 141, the second transfer chamber 142 and/or the third transfer chamber 143 to the flue gas tube 810. Valve 820, valve 830 and/or valve 840 may be in open state.

Generally, each of the described operations may be performed by the controller 500.

The tables below include data on a simulated comparison between a regenerative thermal oxidizer according to the present disclosure and a standard thermal oxidizer. Four reference plants (Plant 1, Plant 2, Plant 3, and Plant 4) have been simulated. The waste gas flow rates and additional characteristics are included in table 1. The composition of the waste gases is shown in table 2.

TABLE 1

| | Waste gas flow [kg/h] | Oxidation air requirement [kg/h] | Reaction temperature [° C.] | Energy from waste gas [MW] | Additional energy required [MW] |
|---|---|---|---|---|---|
| Plant 1 | 26500 | 22755 | 800 | 2.06 | 10.49 |
| Plant 2 | 41128 | 38244 | 850 | 3.26 | 20.64 |
| Plant 3 | 299620 | 292918 | 816 | 16.73 | 139.96 |
| Plant 4 | 34651 | 19651 | 650 | 1.81 | 9.47 |

TABLE 2

| Waste gas composition [% mol] | Plant 1 | Plant 2 | Plant 3 | Plant 4 |
|---|---|---|---|---|
| Hydrogen ($H_2$) | 3.094 | 3.08 | 2.294 | 2.041 |
| Hydrogen sulfide ($H_2S$) | 0.025 | 0.0141 | 0.026 | 0.018 |
| Carbon monoxide (CO) | 0.006 | 0.01 | 0.034 | |
| Carbonyl sulfide (COS) | | | 0.003 | 0.003 |
| Carbon disulfide ($CS_2$) | | 0.0038 | | |
| Water ($H_2O$) | 7.182 | 8.58 | 11.684 | 7.346 |
| Nitrogen ($N_2$) | 84.707 | 86.39 | 69.903 | 89.779 |
| Carbon dioxide ($CO_2$) | 4.983 | 1.93 | 15.234 | 0.803 |
| Sulfur dioxide ($SO_2$) | 0.002 | | | |
| Methane ($CH_4$) | 0.001 | | | |
| Argon (Ar) | | | 0.822 | |

The oxidation air requirement is calculated based on the composition of the waste gas. The reaction temperature is the temperature at which oxidizable components are oxidized. Energy from waste gas is determined based on the composition of the waste gas. Additional energy required is determined based on the composition of the waste gas.

TABLE 3

| Waste gas property | Plant 1 | Plant 2 | Plant 3 | Plant 4 |
|---|---|---|---|---|
| Temperature [° C.] | 42 | 45 | 50 | 42 |
| Pressure [mbarg] | 30 | 40 | 62 | 100 |
| Molweight [g/mol] | 27.29 | 26.67 | 28.79 | 26.57 |

The waste gas properties of table 3 are present at the waste gas source 300.

TABLE 4

| Supplemental energy | TO Supplemental fuel gas [MW] | RTO | RTO vs. TO Supplemental fuel gas reduction [%] |
|---|---|---|---|
| Plant 1 | 10.49 | 1.2 | 89 |
| Plant 2 | 20.64 | 1.9 | 91 |
| Plant 3 | 139.96 | 23 | 84 |
| Plant 4 | 9.47 | 2.57 | 73 |

TO stands for a standard thermal oxidizer and RTO stands for a regenerative thermal oxidizer according to the present disclosure.

Supplemental fuel gas is used to heat the reaction chamber of the TO or RTO. The power indicated in table 4 refers to the power necessary to maintain the desired reaction temperature.

As can be seen in table 4, the supplemental fuel gas reduction achieved by the regenerative thermal oxidizer compared to a standard thermal oxidizer is substantial.

TABLE 5

| Carbon dioxide | TO $CO_2$ emission [t/yr][1 and 2] | RTO | RTO vs. TO $CO_2$ reduction [t/yr] |
|---|---|---|---|
| Plant 1 | 36784 | 20854 | 15930 |
| Plant 2 | 50004 | 14991 | 35013 |
| Plant 3 | 855237 | 650635 | 204602 |
| Plant 4 | 22198 | 9059 | 13139 |

Note 1:
Basis: 8700 operating hours per year.
Note 2:
$CO_2$ emission from waste gas combustion containing hydrocarbons and $CO_2$ not considered.

Table 5 shows CO2 emissions of a standard thermal oxidizer compared to CO2 emissions of a regenerative thermal oxidizer according to the present disclosure. The reduction in CO2 emissions for the regenerative thermal oxidizer according to the present disclosure compared to a standard thermal oxidizer is substantial.

TABLE 6

| Nitrogen oxide (NOx) | TO NOx estimation [kg/h][3] | RTO | RTO vs. TO NOx reduction [kg/h] |
|---|---|---|---|
| Plant 1 | 2.53 | 0.277 | 2.251 |
| Plant 2 | 4.02 | 0.435 | 3.585 |
| Plant 3 | 27.97 | 2.923 | 25.044 |
| Plant 4 | 2.79 | 0.375 | 2.417 |

Note 3:
Bases: TO NOx 70 mg/Nm³; RTO NOx 10 mg/Nm³ considered.

Table 6 includes estimations for NOx emissions for a standard thermal oxidizer and a regenerative thermal oxidizer according to the present disclosure. For all four plants, NOx emission can be substantially reduced when the regenerative thermal oxidizer according to the present disclosure is used compared to a standard thermal oxidizer.

What is claimed is:

1. A system comprising a regenerative thermal oxidizer, wherein the regenerative thermal oxidizer comprises:

at least a first transfer chamber and at least a second transfer chamber, wherein the first transfer chamber comprises a first bed, and the second transfer chamber comprises a second bed;

at least one reaction chamber in fluid flow communication with the first transfer chamber and with the second transfer chamber, wherein waste gas is introducible into the regenerative thermal oxidizer to flow through the first bed to the at least one reaction chamber or to flow through the second bed to the at least one reaction chamber; and one or more first oxygen-containing gas inlets through which oxygen-containing gas is introduced directly into a bed of the regenerative thermal oxidizer, wherein the one or more first oxygen-containing gas inlets are positioned upstream of the at least one reaction chamber.

2. The system of claim 1, wherein the regenerative thermal oxidizer comprises a heater, wherein the one or more first oxygen-containing gas inlets are positioned closer to the first bed than to the heater.

3. The system of claim 1, wherein the system further comprises:

a waste gas tube for connecting a waste gas source with the first transfer chamber and the second transfer chamber;

an oxygen-containing gas tube for connecting an oxygen-containing gas source with the regenerative thermal oxidizer; and a controller, wherein the controller is configured to:

direct waste gas via the waste gas tube through the first bed to the at least one reaction chamber, such that the waste gas is preheated by the first bed, wherein the waste gas includes at least one oxidizable compound; and direct oxygen-containing gas via the oxygen-containing gas tube to the regenerative thermal oxidizer such that the oxygen-containing gas enters the regenerative thermal oxidizer downstream of at least a portion of the first bed.

4. The system of claim 3, wherein, during a first cycle, the controller is configured to:

direct the waste gas via the waste gas tube through the first bed to the at least one reaction chamber, such that the waste gas is preheated by the first bed; and direct the oxygen-containing gas via the oxygen-containing gas tube to the regenerative thermal oxidizer, such that the oxygen-containing gas enters the regenerative thermal oxidizer downstream of at least a portion of the first bed; and wherein, during a second cycle, the controller is configured to:

direct the waste gas via the waste gas tube through the second bed to the at least one reaction chamber, such that the waste gas is preheated by the second bed, and direct the oxygen-containing gas via the oxygen-containing gas tube to the regenerative thermal oxidizer, such that the oxygen-containing gas enters the regenerative thermal oxidizer downstream of at least a portion of the second bed.

5. The system of claim 4, wherein, during the first cycle, the controller is configured to:

direct the oxygen-containing gas via the oxygen-containing gas tube to the regenerative thermal oxidizer, such that the at least one oxidizable compound of the waste gas is oxidized and flue gas is produced in the at least one reaction chamber; and direct the flue gas from the at least one reaction chamber through the second bed such that the flue gas is cooled by the second bed; and wherein, during the second cycle, the controller is configured to:

direct the oxygen-containing gas via the oxygen-containing gas tube to the regenerative thermal oxidizer such that the at least one oxidizable compound of the waste gas is oxidized and flue gas is produced in the at least one reaction chamber; and direct the flue gas from the at least one reaction chamber through the first bed such that the flue gas is cooled by the first bed.

6. The system of claim 4, wherein the system further comprises a bypass tube for connecting a heat exchanger with the regenerative thermal oxidizer, wherein the controller is configured to direct gas from the regenerative thermal oxidizer to the heat exchanger such that the gas is cooled by the heat exchanger.

7. The system of claim 4, wherein:

the regenerative thermal oxidizer comprises at least a third transfer chamber, wherein the third transfer chamber comprises a third bed;

the at least one reaction chamber is in fluid flow communication with the third transfer chamber; and during a third cycle, the controller is configured to:

direct the waste gas via the waste gas tube through the third bed to the at least one reaction chamber such that the waste gas is preheated by the third bed; and direct oxygen-containing gas via the oxygen-containing gas tube to the regenerative thermal oxidizer, such that the oxygen-containing gas enters the regenerative thermal oxidizer downstream of at least a portion of the third bed.

8. The system of claim 7, wherein: during the first cycle, the controller is configured to:

direct the oxygen-containing gas via the oxygen-containing gas tube to the regenerative thermal oxidizer, such that the oxidizable compound of the waste gas is oxidized and flue gas is produced in the at least one reaction chamber; and direct the flue gas from the at least one reaction chamber through at least one of the second bed and the third bed such that the flue gas is cooled;

during the second cycle, the controller is configured to:

direct the oxygen-containing gas via the oxygen-containing gas tube to the regenerative thermal oxidizer such that the oxidizable compound of the waste gas is oxidized and flue gas is produced in the at least one reaction chamber; and direct the flue gas from the at least one reaction chamber through at least one of the first bed and the third bed such that the flue gas is cooled; and during the third cycle, the controller is configured to:

direct the oxygen-containing gas via the oxygen-containing gas tube to the regenerative thermal oxidizer such that the oxidizable compound of the waste gas is oxidized and flue gas is produced in the at least one reaction chamber; and direct the flue gas from the at least one reaction chamber through at least one of the first bed and the second bed such that the flue gas is cooled.

9. The system of claim 8, wherein the system further comprises a bypass tube for connecting a heat exchanger with the regenerative thermal oxidizer, wherein the controller is configured to direct gas from the regenerative thermal oxidizer to the heat exchanger such that the gas is cooled by the heat exchanger.

10. The system of claim 9, wherein the waste gas comprises less than 20.0 vol.-% oxygen.

11. The system of claim 10, wherein the regenerative thermal oxidizer comprises a heater, wherein the heater is configured to heat at least a portion of the regenerative thermal oxidizer, and wherein the heater comprises a burner and/or an electrical heating element.

12. A system comprising a regenerative thermal oxidizer, wherein the regenerative thermal oxidizer comprises:

at least a first transfer chamber and at least a second transfer chamber, wherein the first transfer chamber comprises a first bed, and the second transfer chamber comprises a second bed;

at least one reaction chamber in fluid flow communication with the first transfer chamber and with the second transfer chamber, wherein waste gas is introducible into the regenerative thermal oxidizer to flow through the first bed to the at least one reaction chamber or to flow through the second bed to the at least one reaction chamber; and one or more first oxygen-containing gas inlets through which oxygen-containing gas is introduced into the regenerative thermal oxidizer, wherein the first oxygen-containing gas inlets are positioned between at least a portion of the first bed and at least a portion of the at least one reaction chamber or positioned between at least a portion of the second bed and at least a portion of the at least one reaction chamber, wherein the one or more first oxygen-containing gas inlets are positioned between at least a portion of the first bed and at least a portion of the at least one reaction chamber, and the regenerative thermal oxidizer further comprises one or more second oxygen-containing gas inlets through which oxygen-containing gas is introduced into the regenerative thermal oxidizer, wherein the one or more second oxygen-containing gas inlets are positioned between at least a portion of the second bed and at least a portion of the at least one reaction chamber.

13. The system of claim 12, wherein:

the regenerative thermal oxidizer further comprises at least a third transfer chamber, wherein the third transfer chamber comprises a third bed;

the at least one reaction chamber is in fluid flow communication with the third transfer chamber; and the regenerative thermal oxidizer further comprises one or more third oxygen-containing gas inlets through which for oxygen-containing gas can be is introduced into the regenerative thermal oxidizer, wherein the one or more third oxygen-containing gas inlets are positioned between at least a portion of the third bed and at least a portion of the at least one reaction chamber.

14. The system of claim 13, wherein the regenerative thermal oxidizer comprises at least two oxygen-containing gas inlets per transfer chamber.

15. The system of claim 13, wherein the regenerative thermal oxidizer comprises a heater, wherein the one or more first oxygen-containing gas inlets are positioned closer to the first bed than to the heater.

16. The system of claim 15, wherein the regenerative thermal oxidizer comprises at least four oxygen-containing gas inlets per transfer chamber.

17. A method of operating a regenerative thermal oxidizer, the method comprising the steps of:

directing waste gas through a first bed of a first transfer chamber of the regenerative thermal oxidizer to a reaction chamber of the regenerative thermal oxidizer, such that the waste gas is preheated by the first bed, wherein the waste gas includes at least one oxidizable compound; and directing oxygen-containing gas to the regenerative thermal oxidizer, such that the oxygen-containing gas enters the regenerative thermal oxidizer downstream of at least a portion of the first bed.

18. The method of claim 17, wherein the method comprises: during a first cycle, the steps of:

directing the waste gas through the first bed of the first transfer chamber of the regenerative thermal oxidizer to the reaction chamber of the regenerative thermal oxidizer, such that the waste gas is preheated by the first bed; and directing the oxygen-containing gas to the regenerative thermal oxidizer, such that the oxygen-containing gas enters the regenerative thermal oxidizer downstream of at least a portion of the first bed; and wherein the method comprises, during a second cycle, the steps of: directing the waste gas through a second bed of a second transfer chamber of the regenerative thermal oxidizer to the reaction chamber of the regenerative thermal oxidizer, such that the waste gas is preheated by the second bed; and directing the oxygen-containing gas to the regenerative thermal oxidizer, such that the oxygen-containing gas enters the regenerative thermal oxidizer downstream of at least a portion of the second bed.

19. The method of claim 18, further comprising: during the first cycle:

directing the oxygen-containing gas to the regenerative thermal oxidizer such that the oxidizable compound of the waste gas is oxidized and flue gas is produced in the reaction chamber; and directing the flue gas from the reaction chamber through the second bed such that the flue gas is cooled by the second bed; and during the second cycle:

directing the oxygen-containing gas to the regenerative thermal oxidizer such that the oxidizable compound of the waste gas is oxidized and flue gas is produced in the reaction chamber; and directing the flue gas from the reaction chamber through the first bed such that the flue gas is cooled by the first bed.

20. The method of claim 19, wherein the waste gas and the oxygen-containing gas are mixed in the regenerative thermal oxidizer to allow oxidation of the oxidizable compound of the waste gas by oxygen of the oxygen-containing gas.

* * * * *